United States Patent
Fujisawa et al.

(10) Patent No.: US 12,052,055 B2
(45) Date of Patent: Jul. 30, 2024

(54) METHOD OF EQUALIZING WAVEFORM DISTORTION, TERMINAL DEVICE, AND OPTICAL COMMUNICATION SYSTEM

(71) Applicant: NEC CORPORATION, Tokyo (JP)

(72) Inventors: Shinsuke Fujisawa, Tokyo (JP); Naoto Ishii, Tokyo (JP); Ankith Vinayachandran, Tokyo (JP); Emmanuel Le Taillandier De Gabory, Tokyo (JP); Fatih Yaman, Princeton, NJ (US); Hussam G. Batshon, Princeton, NJ (US)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 17/870,862

(22) Filed: Jul. 22, 2022

(65) Prior Publication Data
US 2024/0031026 A1   Jan. 25, 2024

(51) Int. Cl.
*H04B 10/2507* (2013.01)
*H04B 10/2543* (2013.01)
*H04B 10/61* (2013.01)

(52) U.S. Cl.
CPC ..... *H04B 10/2507* (2013.01); *H04B 10/2543* (2013.01); *H04B 10/6163* (2013.01)

(58) Field of Classification Search
None
See application file for complete search history.

(56) References Cited

U.S. PATENT DOCUMENTS 8,447,186 B2 * 5/2013 Tanimura ............. H04B 10/697
398/147
8,861,981 B2 * 10/2014 Liu .................. H04B 10/25133
398/208

(Continued)

FOREIGN PATENT DOCUMENTS

| EP | 2723004 A1 | 4/2014 |
| EP | 3703279 A1 | 9/2020 |
| WO | 2019191099 A1 | 10/2019 |

OTHER PUBLICATIONS

Christian Hager et al., "Nonlinear interference mitigation via deep neural networks", OFC 2018 paper W3A.4. 3pp.

(Continued)

*Primary Examiner* — Jai M Lee
(74) *Attorney, Agent, or Firm* — HAUPTMAN HAM, LLP

(57) ABSTRACT

An optical communication system includes a first terminal device configured to receive first data, wherein the first terminal device is configured to generate an optical waveform based on the received first data. The optical system further includes an optical communication path configured to receive the optical waveform from the first terminal device. The optical system further includes a second terminal device configured to receive the optical waveform from the optical communication path, wherein the second terminal device is configured to output second data based on the optical waveform. At least one of the first terminal device or the second terminal device includes a nonlinear waveform distortion compensation device. The nonlinear waveform compensation device is configured to correct nonlinear waveform distortion resulting from the optical waveform propagating along the optical communication path, and the nonlinear waveform compensation device includes at least one recursive intermediate layer.

20 Claims, 18 Drawing Sheets

(56) References Cited

U.S. PATENT DOCUMENTS

| | | | |
|---|---|---|---|
| 8,873,971 B2 | 10/2014 | Ip et al. | |
| 9,209,899 B2* | 12/2015 | Yan | H04B 10/2572 |
| 9,258,060 B2* | 2/2016 | Yan | H04B 10/2507 |
| 9,515,763 B2* | 12/2016 | Honda | H04B 10/6161 |
| 9,853,765 B2* | 12/2017 | Yasuda | H04B 10/6163 |
| 10,833,770 B2 | 11/2020 | Zhang et al. | |
| 11,716,149 B2* | 8/2023 | Sasai | H04B 10/6161 |
| 11,728,889 B2* | 8/2023 | Sasai | H04B 10/2513 |
| | | | 398/202 |
| 11,728,900 B2* | 8/2023 | Arikawa | H04L 25/03057 |
| | | | 398/158 |
| 2010/0232796 A1 | 9/2010 | Cai | |
| 2011/0255879 A1* | 10/2011 | Xie | H04B 10/2543 |
| | | | 398/208 |
| 2013/0170842 A1 | 7/2013 | Koike-Akino et al. | |
| 2019/0207589 A1* | 7/2019 | Alic | H04L 25/03012 |
| 2021/0256347 A1 | 8/2021 | Fujisawa et al. | |

OTHER PUBLICATIONS

Bertold Ian Bitachon et al., "Deep learning based digital backpropagation demonstrating SNR gain at low complexity in a 1200 km transmission link", Optics Express, vol. 28, No. 20, Sep. 28, 2020, pp. 29318-29334 (2020)).17pp.

* cited by examiner

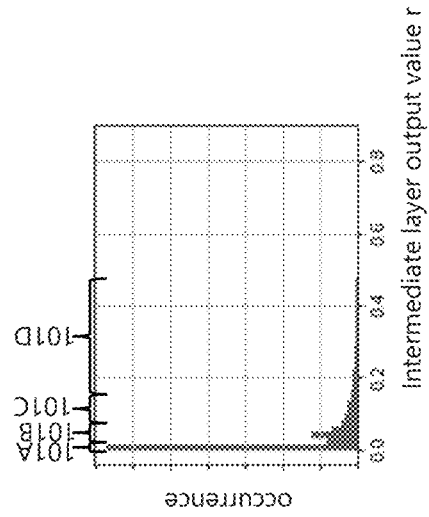

METHOD OF EQUALIZING WAVEFORM DISTORTION, TERMINAL DEVICE, AND OPTICAL COMMUNICATION SYSTEM

TECHNICAL FIELD

The current description relates to a method of equalizing waveform distortion, a terminal device, and an optical communication system.

BACKGROUND

Since traffic volume on backbone networks is rapidly increasing due to the increased use of the Internet to communicate between devices, optical communication systems have been introduced to efficiently accommodate high-capacity traffic demand in backbone networks. Optical communication systems provide the functionality of communicating demand traffic using a single channel in an optical fiber communication line connecting communication hubs, such as base stations. The channel is usable to communicate information related to recent traffic demand on the optical communication system. The realization of a Terabyte/Second (TBPS)-class optical communication system helped to facilitate such a large-capacity optical communication system. Digital signal processing, such as a multi-value modulation method or a polarization multiplex separation method, is used to improve frequency utilization efficiency.

Further, long distance communication using the large-capacity optical communication system is used to communicate between locations separated by significant distances, such as by mountains, oceans, seas, or deserts. In some instances, a total cable length of the optical communication system reaches 10,000 kilometers (km) or more. For example, optical submarine cables are usable to provide a large-capacity communication infrastructure between locations separated by the sea. As a distance that an optical signal travels along an optical cable increases, an amount of distortion of the optical signal also increases. The impact of this distortion is more prevalent in the long distance communication infrastructure.

In some instances, amplifiers are used along the optical cable to boost the optical signal. When the total length of the optical fiber communication path becomes long, the number of optical amplifiers through which the optical signal passes in the communication path increases. However, these amplifiers reduce the optical signal-to-noise ratio detected by the terminal device on the receiving side of the optical communication system. The reduced signal-to-noise ratio deteriorates the signal quality detected by the terminal device. Despite the drawbacks of the amplifiers, if the amplifiers are not used then the optical signal intensity on the transmitting side is increased in order to improve the received optical signal noise ratio. This increase in optical signal intensity causes nonlinear waveform distortion in the optical fiber communication path increases. As a result, the signal quality is still deteriorated.

A nonlinear waveform distortion compensation technique in an optical fiber communication path includes a digital back propagation method. The digital back propagation method realizes distortion compensation by simulating nonlinear waveform distortion in an optical fiber communication path by digital signal processing and applying an adverse effect of nonlinear waveform distortion to the data received by the terminal device. The back propagation method is effective for reducing the deterioration effects on the optical signal related to distance that the optical signal travels. An example of a digital back propagation method is described in Patent Document 1.

The digital back propagation method includes optimizing the features related to the nonlinear waveform distortion in advance to be effective. Optimizing the features requires an accurate understanding of the physical characteristics of the optical fiber channel. In some instances, the optimization is performed when introducing the terminal equipment. However, the optimization process involves a skilled engineer with an ability to manually calculate the features in the optical signal continuity test. This manual processing consumes a large amount of time. Furthermore, if the physical characteristics of the optical fiber channel change due to deterioration over time, a re-optimizing is performed by the skilled engineer.

In an effort to improve efficiency, automation of nonlinear waveform distortion compensation is sought to finely respond to changes in the physical characteristics of optical fiber channels. In recent years, a method was developed that realizes distortion compensation by automatically acquiring features related to nonlinear waveform distortion by learning nonlinear waveform distortion from received data using a neural network and applying the adverse effect to the received data. The goal is for the neural networks to include residual nonlinear waveform distortion that could not be captured by the nonlinear waveform distortion model of the digital back propagation method. Examples of such a waveform distortion compensation function are described in Patent Document 2, Non-Patent Document 1, and Non-Patent Document 2.

FIG. 1 is a block diagram of an optical communication system 90 using a neural network. As shown in FIG. 1A, the optical communication system 90 includes an optical transmitter 91, an optical fiber communication path 92, and an optical receiver 93. The optical communication system 90 connects the optical transmitter 91 and the optical receiver 93 to the optical fiber communication path 92.

The optical transmitter 91 has a transmission end client interface 910, a transmission data generation unit 911, and an optical waveform generation unit 912. The optical receiver 93 includes an optical waveform receiving unit 930, a waveform distortion compensating unit 931, a received data demodulation unit 932, and a receiving end client interface 933. The waveform distortion compensation unit 931 has a linear waveform distortion compensation unit 9310 and a nonlinear waveform distortion compensation unit 9311.

FIG. 1B is a block diagram of a nonlinear waveform distortion compensation unit 9311. The nonlinear waveform distortion compensation unit 9311 is able to be included in an optical communication system, such as the optical communication system 90. The above-mentioned nonlinear waveform distortion compensation unit 9311 has an input layer 940, intermediate layers 941-0, 941-1, 941-2, and an output layer 942. The input layer 940 has a product-sum calculation unit 95-0, the intermediate layer 941-0 has a product-sum calculation unit 95-1, and the intermediate layer 941-1 has a product-sum calculation unit 95-2, and the intermediate layer 941-2 includes a product-sum calculation unit 95-3, and the output layer 942 includes a product-sum calculation unit 95-4.

For the sake of brevity, in following description, when the elements having a subscript (−1, −2, etc.) attached to the number of the same type of device or the like are collectively described, the subscript of the number shall be omitted.

Next, the operation of the optical communication system 90 accommodating the traffic in the optical signal will be described.

The optical transmitter 91 performs symbol mapping for applying the multi-value modulation method or the polarization multiplex separation method in the transmission data generation unit 911 based on a request traffic input from the transmission end client interface 910, to generate the transmission data. The transmission data is input to the waveform generation unit 912. The optical waveform generation unit 912 generates an optical waveform based on the transmission data, and the optical waveform is transmitted to the optical fiber communication path 92. In some instances, the optical waveform generator 912 includes a radio frequency (RF) amplifier and an optical In-Phase Quadrature-Phase (I/Q) modulator. The optical waveform generator 912 generates an optical waveform from an electric waveform of the transmission data.

The optical receiver 93 includes the waveform distortion compensating unit 931 for the received data obtained by coherent detection of the optical waveform propagating in the optical fiber communication path 92. The optical waveform is received in the optical waveform receiving unit 930 which performs analog-digital conversion. After compensating for the linear and non-linear waveform distortion contained in the received data, using the waveform distortion compensating unit 931, the received data demodulation unit 932 performs symbol demapping due to the application of the multi-value modulation method and the polarization multiplex separation method. The resulting data is transferred to the receiving end client interface 933.

By the above operation, the optical communication system 90 is able to accommodate the traffic in the optical channel.

In some instances of the optical communication system 90 the compensating for the above-mentioned nonlinear waveform distortion is performed after learning the nonlinear waveform distortion from the received data using the neural network. The non-linear waveform distortion compensation unit 9311 is, for example, a neural network having three intermediate layers (also referred to as hidden layers), and the received data input to the waveform distortion compensation unit 931 is input to the input layer 940, and the output layer 942. The output layer 942 outputs the received data for which the non-linear waveform distortion is compensated. The product-sum calculation unit 95 performs weight matrix product-sum calculation, bias value addition, and activation function calculation of the neural network in each layer 941-0, 941-1 and 941-2, respectively, to implement nonlinear waveform distortion compensation.

An example of the learning the operation of the nonlinear waveform distortion compensation unit 9311 is described using supervised learning. In supervised learning, known transmission data is transmitted from the optical transmitter 91 as teacher data for the nonlinear waveform distortion compensation unit 9311, the output of the linear waveform distortion compensation unit 9310 is input to the input layer 940, and then the output layer 942 is used. The training is completed by optimizing the weight values and bias values of the layers 941-0, 941-1 and 941-2 so that the mean square error between the output data of the output layer 942 and the above-mentioned known transmission data is minimized. In some instances, a stochastic gradient descent method, an Adam method, an RMSProp method, or the like is used as an optimization algorithm. By adopting the weight value and the bias value obtained by the supervised learning as the feature amount of the non-linear waveform distortion compensating unit 9311, the non-linear waveform distortion compensation is realized not only for the teacher data but also for other received data.

Through the above operation, compensation for nonlinear waveform distortion is realized in the optical receiver 93 included in the optical communication system 90.

[Patent Document 1] U.S. Pat. No. 8,873,971 B2
[Patent Document 2] U.S. Pat. No. 10,833,770 B2
[Patent Document 3] Pub. No.: US2021/0256347 A1
[Non-Patent Document 1] C. Hager et al., "Nonlinear interference mitigation via deep neural networks," OFC 2018 paper W3A.4.
[Non-Patent Document 2] BI Bitachon et al., "Deep learning based digital backpropagation demonstrating SNR gain at low complexity in a 1200 km transmission link," Optics Express, Vol. 28, No. 20, pp. 29318-29334 (2020)).

SUMMARY

The current description includes an optical communication system utilizing a neural network to estimate non-linear waveform distortion based on a comparison result between a received signal data and a transmitted signal data obtained by digital demodulation processing of the waveform received in an optical end station device. The waveform distortion equalization method compensates for distortion by applying an adverse effect of the estimated waveform distortion to the received signal data. By applying the waveform distortion method, non-linear waveform distortion due to transmission through long optical cables, such as an optical submarine cable, is compensated for, and the output optical signal is improved. The current description also relates to an end-station device having an ability to compensation for nonlinear waveform distortion occurring in an optical fiber transmission line.

As mentioned above, a nonlinear waveform distortion compensation method using a neural network is able to accurately and precisely respond to changes in the physical characteristics of an optical fiber communication path over time. In other approaches, the number of layers of the intermediate layer of the neural network used to implement the nonlinear waveform distortion compensation increases as the nonlinear waveform distortion increases resulting from the distance of the optical signal path. (See, for example, Non-Patent Document 2).

As the number of layers of the intermediate layer increases, an overall size of the circuit for the nonlinear waveform distortion compensation unit increases because each intermediate layer includes a product-sum calculation unit. If the number of intermediate layers increases beyond a threshold value, the circuit scale of the nonlinear waveform distortion compensation unit will exceed the upper limit of the ASIC circuit resources used for real-time processing of waveform distortion compensation.

As described in Patent Document 3, a method using a look-up table (LUT) provides an alternative for reducing the circuit scale of the nonlinear waveform distortion compensation method utilizing a neural network. In some embodiments, the nonlinear waveform pre-distortion unit 9131 includes a LUT based on the premise that nonlinear waveform distortion is estimated with respect to the transmitted data in the optical transmitter. In the equalization, the transmitted data is Quadrature Phase Shift Keying (QPSK), 16 Quadrature Amplitude Modulation (QAM), 32QAM and 64QAM are symbol-mapped on the premise of multi-level modulation methods, so a neural that implements the non-linear waveform distortion by utilizing symmetry about the I/Q axis. In the input layer of the network, the solution candidates of the multiplication unit among the product-sum calculation units are limited, so that the multiplication solution is able to be stored in the LUT. Replacing the multiplication unit with the LUT contributes to the reduction of the circuit scale.

However, the circuit scale reduction offered by the LUT described in Patent Document 3 is not able to be applied when the optical receiver has a non-linear waveform distortion compensating section. Further, an intermediate layer is used to replace the multiplying section of the input layer with a LUT. Although the use of the LUT is effective for a non-linear waveform pre-distortion unit with a small number of intermediate layers, the circuit scale reduction effect is reduced as the number of intermediate layers increases.

The current description relates to a waveform distortion equalization method, a terminal device, or an optical communication system that helps to resolve the above noted issues of accounting for changes in physical characteristics of an optical cable as well as maintaining a sufficiently small circuit size to permit implementation in a terminal device. The circuit scale of the neural network helps to implement non-linear waveform distortion compensation for a long distance optical cable carrying a large-capacity of optical communications. In some embodiments, the optical communication system is able to maintain large transmission capacity by automatically adjusting for changes of the physical characteristics of the optical fiber communication path. By limiting the scale to the circuit, the non-linear waveform distortion compensating unit is able to be effectively implemented in an ASIC.

The waveform distortion equalization method according to the some embodiments includes a representative value determining device for selecting a value frequently appearing as a value of optical signal data as a representative value, and an equalization matrix of waveform distortion included in the representative value and the optical waveform. The waveform distortion equalization method also includes a multiplication device for calculating the product of the products and an equalization learning device for learning the waveform distortion equalization setting of the optical signal data composed of the products. The waveform distortion equalization method further includes a multiplication holding medium for storing the calculated value of the product in the equalization learning device. The waveform distortion method further includes a value holding medium and an adding device for adding the values of the products held by the multiplication holding medium. The waveform distortion is recursively equalized with respect to the optical signal data using one or more intermediate layers. In some embodiments, the waveform distortion is recursively equalized using a single intermediate layer.

According to some embodiments of the waveform distortion equalization method, the terminal device, and the optical communication system according to the present description, the number of intermediate layers used for the nonlinear waveform distortion equalization is reduced in comparison with other approaches. The product-sum calculation device is recursively used by re-inputting the output value of the intermediate layer back into the intermediate layer. An occurrence rate of the output value of the intermediate layer and the output layer is monitored. According to the distribution of the occurrence, a representative value is determined. The output values of the intermediate layer and the output layer are approximated to the representative value. By storing the solution of the multiplication part of the product-sum calculation part in the intermediate layer in a lookup table, the non-linear waveform distortion equalization is able to be implement on a much smaller circuit scale that previously possible. This allows the automatic compensation for physical characteristic changes in an optical cable without the manual calculation of a skilled engineer using a device that is sufficiently small to be included in a terminal device of an optical communication system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 10B is a graph of an occurrence distribution of output values of an intermediate layer in a nonlinear waveform distortion equalization device usable for determining a representative value and a plurality of intervals according to some embodiments.

DETAILED DESCRIPTION

Figure 1A:
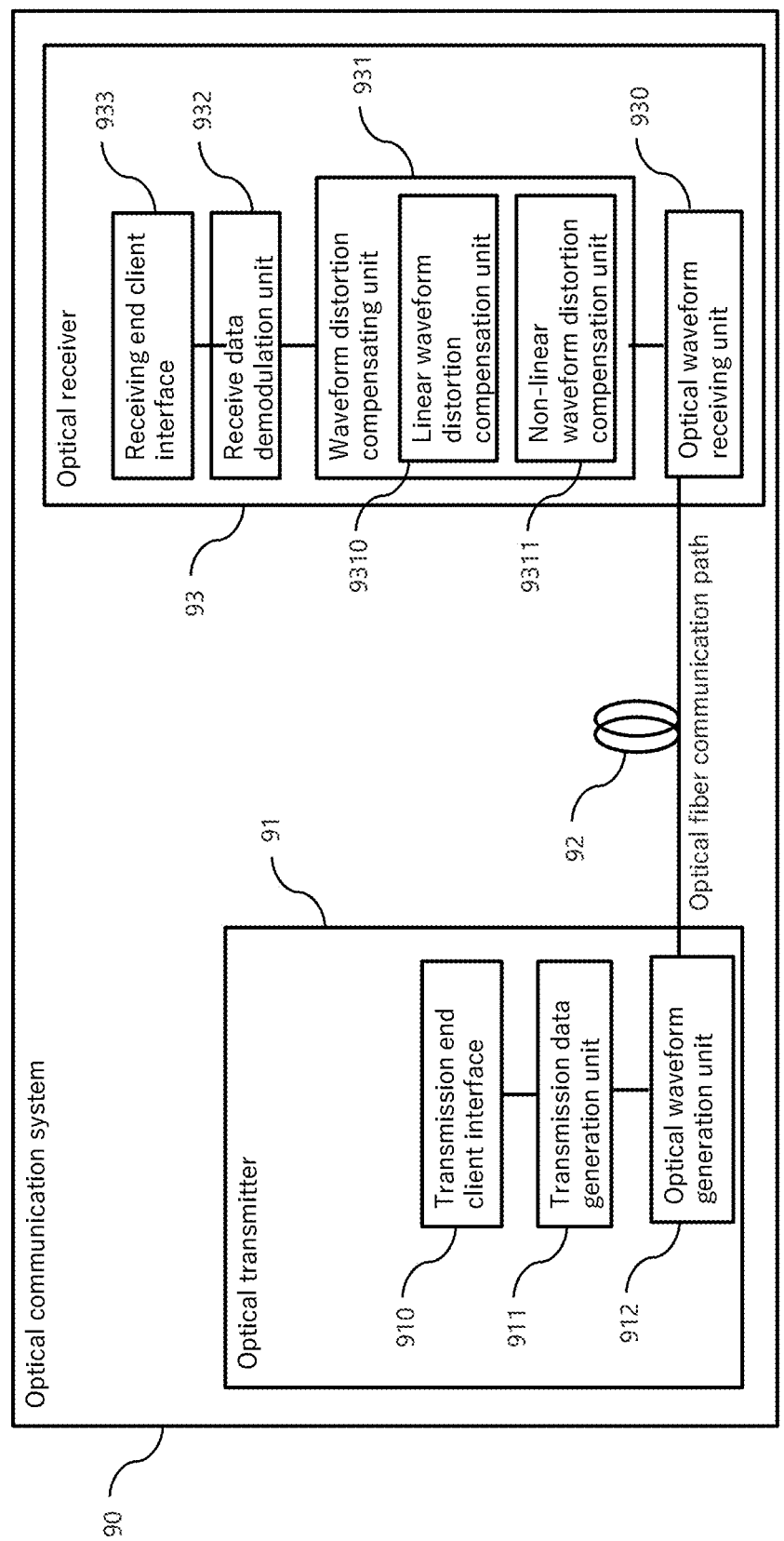
FIG. 1A is a block diagram of an optical communication system.
Figure 1B:
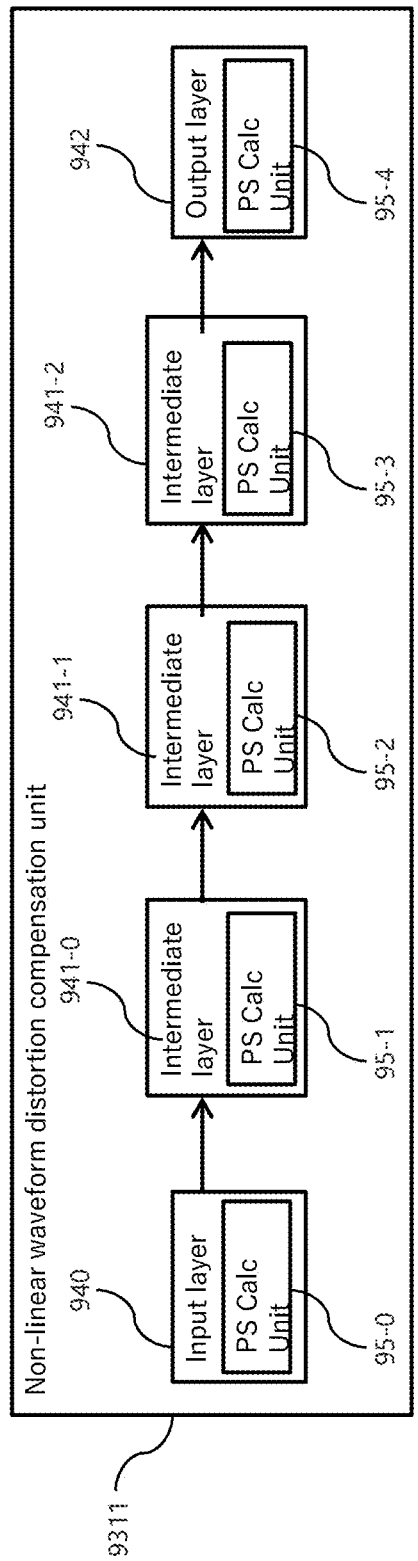
FIG. 1B is a block diagram of a nonlinear waveform distortion compensation unit includable in the optical communication system of FIG. 1A.
Figure 1C:
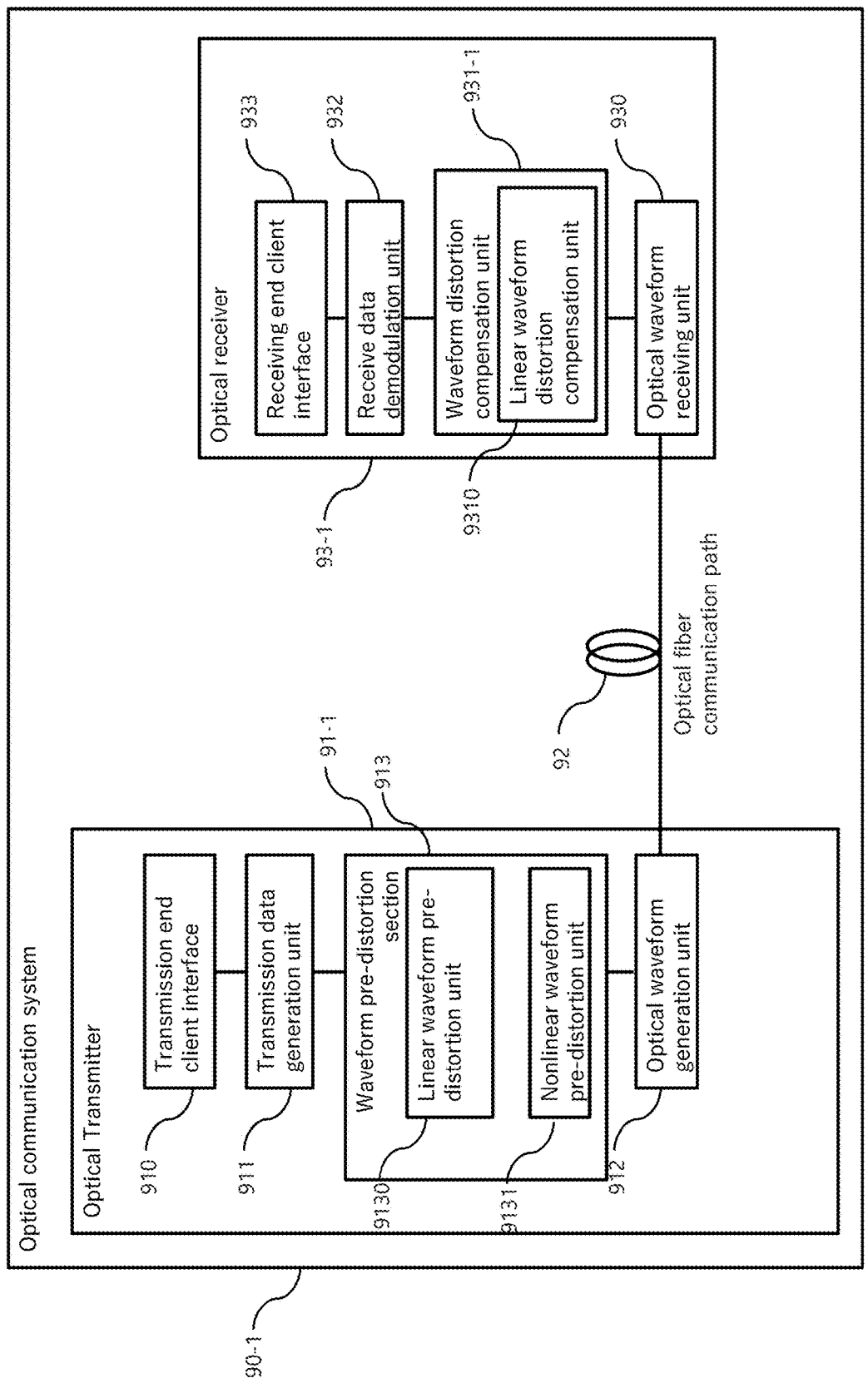
FIG. 1C is a block diagram of an optical communication system including a nonlinear waveform pre-distortion method.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As noted above, optical communication is increasing due to reliance of fast reliable data transfer. Optical communication is performed, in some instances, using an optical signal traveling along an optical communication path, such as an optical fiber. As the optical signal propagates along the optical communication path, the signal degrades. In some instances, the signal degradation is due to loss of intensity, e.g., due to incomplete reflection at a core/cladding interface of the optical fiber, dispersion, e.g., due to inconsistencies with the optical fiber, or other factors impacting a physical condition for the optical communication path, e.g., due to bending of the optical fiber. This signal degradation increases as a length of the optical communication path increases. Some of this degradation is linear in nature and relatively easy to account for when decoding the optical signal. However, some of this degradation is nonlinear in nature, which is often more difficult to account for when decoding the optical signal. As a result, a risk of loss of data or inaccurate decoding of the optical signal increases as nonlinear distortion of the optical signal increases.

Other approaches rely on experienced engineers to analyze an optical communication system in order to determine how to compensation for the nonlinear distortion. This process is expensive and time consuming. This description includes an optical communication system that uses automatic learning in order to help improve a speed and reduce a cost of compensation for nonlinear distortion. This description includes a nonlinear waveform distortion compensation unit that is sufficiently small to fit within a terminal device of an optical communication system, yet sufficiently robust to provide accurate and precise compensation for nonlinear waveform distortion.

The optical communication system and terminal device of this description is also usable to compensate for changes in the performance of the optical communication path over time. In numerous situations, portions of long distance optical communication paths are not readily accessible. For example, optical communication paths that are within an ocean or sea; passing through a mountain; or in remote locations are difficult to access and either replace or repair portions of the optical communication path. During the useful life of the optical communication path, physical characteristics of the optical communication path are prone to change, for example due to earthquakes, tsunamis, or other natural disasters. In order to compensation for these changes in physical characteristics the terminal device is re-adjusted to compensation for new nonlinear distortions to the optical signal. In approaches that rely on skilled engineers, the time to develop a new compensation model increases a risk that communications will be inaccurate, reduced, or completely discontinued until the new compensation model is developed and deployed. In a situation where the physical characteristic change is due to some type of natural disaster, a time period for even getting the skilled engineer to the proper location to begin the analysis of the optical communication path is likely increased. In order to help resolve these issues, the current description is able to utilize automatic learning that is capable of being deployed directly in a terminal device of an optical communication system to allow for generation of new compensation models for nonlinear distortion of the optical signal in an independent manner. As a result, impacts to communication along the optical communication path are reduced in both magnitude and time; allowing maintenance or rapid restoration of optical communication following changes in physical characteristics of the optical communication path.

In addition, changes in the physical characteristics of the optical communication path also occur due to normal wear on the components of the optical communication path. This automatic learning functionality of the current description helps to facilitate regular updates to the compensation model for nonlinear distortion to help account for gradual degradation within the optical communication system.

Figure 2:
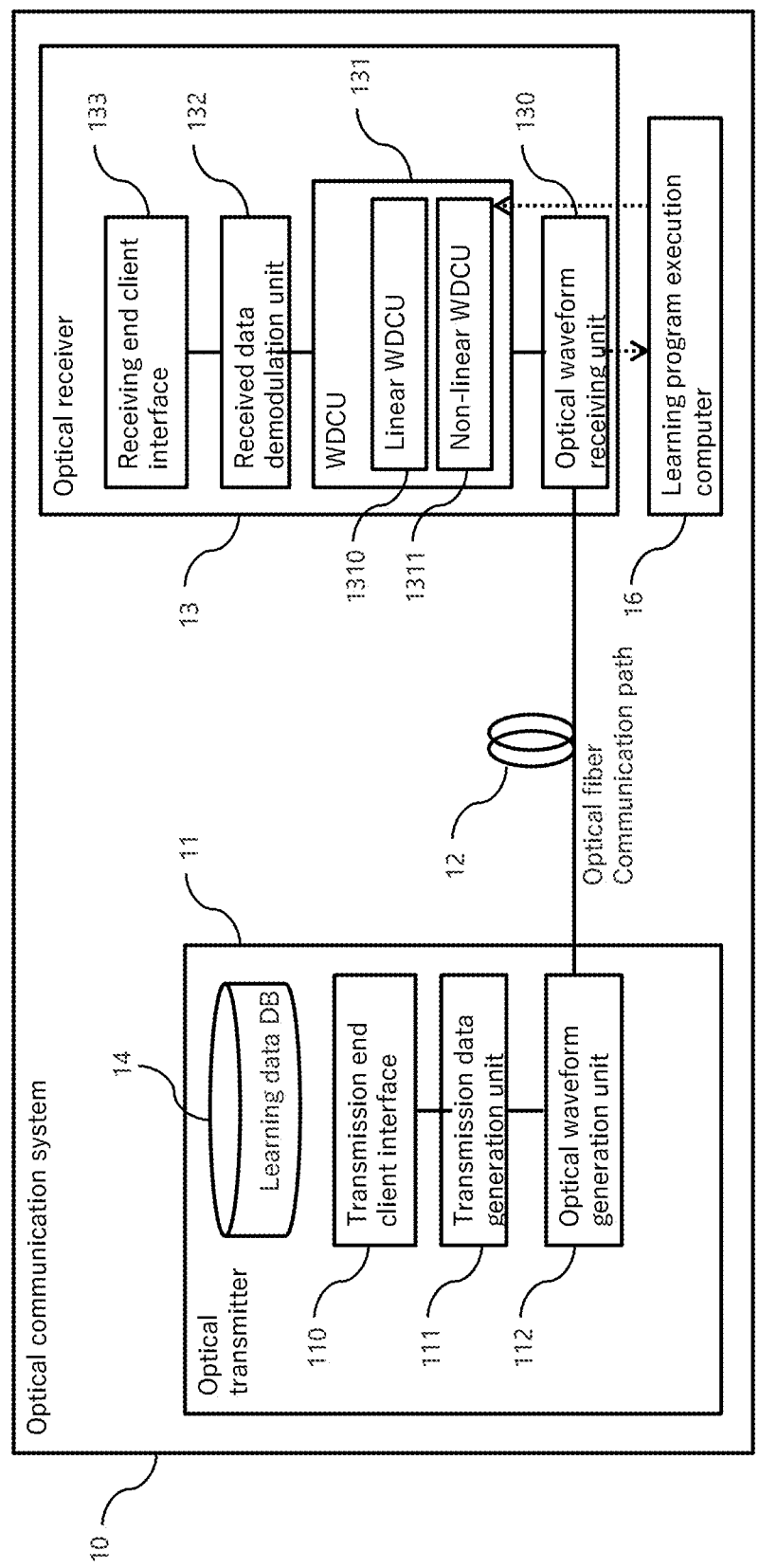
FIG. 2 is a block diagram of an optical communication system according to some embodiments.

FIG. 2 is a block diagram of an optical communication system 10 according to some embodiments. As shown in FIG. 2, the optical communication system 10 includes an optical transmitter 11, an optical fiber communication path 12, an optical receiver 13, and a learning program execution computer 16. The optical communication system 10 includes a single optical transmitter 11 connected to a single optical receiver 13 by t a single optical fiber communication path 12. One of ordinary skill in the art would understand that the number of components in FIG. 2 is merely an example and that more than one of any of the optical transmitter 11, the optical fiber communication path 12, or the optical receiver 13 is possible through the use of multiplexers and/or de-multiplexers being introduced into the optical communication system 10. Similarly, while FIG. 2 includes a single learning program execution computer, one of ordinary skill in the art would understand that the execution of the automatic learning is possible using multiple computers, including cloud-based computing, in some embodiments. Each of the optical transmitter 11 and the optical receiver 13 is called a terminal device because the component is present at a terminus of the optical fiber communication path 12.

The optical transmitter 11 has a transmission end client interface 110, a transmission data generation unit 111, an optical waveform generation unit 112, and a learning data database (DB) 14. The optical receiver 13 includes an optical waveform receiving unit 130, a waveform distortion compensating unit (WDCU) 131, a received data demodulation unit 132, and a receiving end client interface 133. The waveform distortion compensation unit 131 includes a linear waveform distortion compensation unit 1310 and a nonlinear waveform distortion compensation unit 1311.

The optical transmitter 11 performs symbol mapping for applying a multi-value modulation method or a polarization multiplex separation method in the transmission data generation unit 111 based on requested input data from the transmission end client interface 110 in order to create an electronic version of the transmission data. In some embodiments, the end client interface 110 includes an input/output (I/O) device, such as a touch screen, a keyboard, a mouse, an audio receiver, etc. In some embodiments, the transmission data generation unit 111 includes one dimensional (1D) distribution matcher (DM). In some embodiments, the data generation unit 111 includes a two-dimensional (2D) DM. In some embodiments, the transmission data generation unit 111 includes a bit labeler. In some embodiments, the transmission data generation unit 111 includes a low-density parity check (LDPC). In some embodiments, the transmission data generation unit 111 is configured to generated shaped QAM symbols, such as 16QAM symbols, 32QAM symbols, or 64QAM symbols. The transmission data is input to the waveform generation unit 112. The optical waveform generation unit 112 generates an optical waveform based on the received transmission data. In some embodiments, the optical waveform generation unit 112 includes an arbitrary waveform generator (AWG) capable of modulating an optical signal from a light source. In some embodiments, the light source includes a laser capable of emitting light of one of more wavelengths.

The optical waveform is transmitted to the optical fiber communication path 12. In some embodiments, the optical fiber communication path 12 includes a core of optically transparent material; and a cladding having a higher refractive index than the core. In some embodiments, the optical fiber communication path 12 has a circular cross-section, a rectangular cross-section, or another suitable cross-sectional shape.

The optical receiver 13 includes an optical waveform receiving unit 130 configured to receive the optical waveform from the optical fiber communication path 12. The optical waveform receiving unit 130 performs coherent detection of an optical waveform and then performs analog to digital conversion, e.g., using an analog-to-digital converter (ADC), to generate a received data signal. The waveform distortion compensating unit 131 receives the received data signal and performs compensation operations on the received data. The linear waveform distortion compensating unit 1310 compensates for the linear waveform distortion contained in the received data, the non-linear waveform distortion compensating unit 1311 compensates for the non-linear waveform distortion contained in the received data. The waveform distortion compensation unit 131. The received data demodulation unit 132 performs multi-value demodulation on the compensated signal to produce a demodulated signal. After performing the symbol demodulation or the polarization multiplex separation method, the demodulated signal is output to an end-user using the receiving terminal client interface 133. In some embodiments, the receiving terminal end client interface 133 includes an input/output (I/O) device, such as a touch screen, a display, an audio device, etc.

The learning data DB 14 in the optical transmitter 11 stores learning data usable for the supervised learning in the nonlinear waveform distortion compensating unit 1311, and saves the learning data in the transmission data generation unit 111 when the supervised learning is performed. The learning operation will be described below using an example of supervised learning. One of ordinary skill in the art would understand that unsupervised learning is also possible; and that when unsupervised learning is used the learning data DB 14 is omitted, in some embodiments.

The nonlinear waveform distortion compensating unit 131 employs the waveform distortion equalization method of compensating for the nonlinear waveform distortion after learning is completed, according to some embodiments. The nonlinear waveform distortion compensation unit 1311 is a recursive neural network, and an example where the intermediate layer is one layer as an example is described below. However, one of ordinary skill in the art would recognize that multiple recursive layers within the nonlinear waveform distortion compensation unit 1311 are also within the scope of this description.

The learning program execution computer 16 is configured to receive the received data from the optical waveform receiving unit 130; and to provide learning data to the nonlinear waveform distortion compensation unit 1311. Additional details with respect to the operation of the learning program execution computer 16 are described below with respect to FIG. 6, in accordance with some embodiments.

Figure 3:
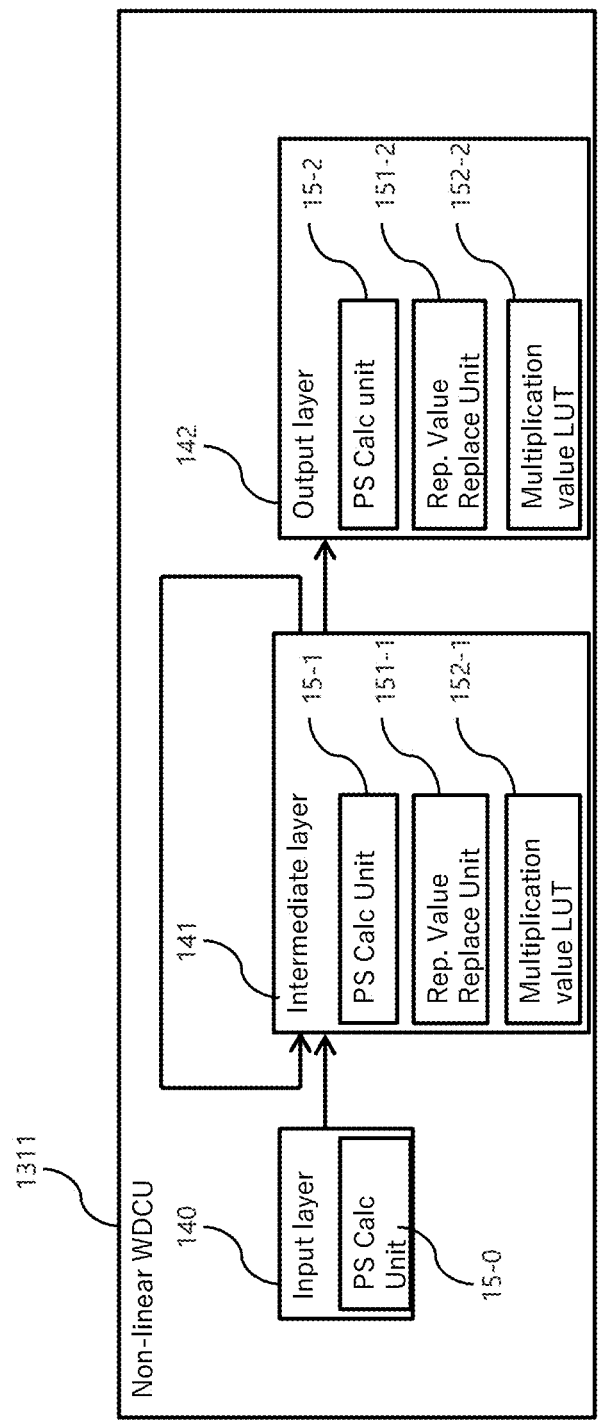
FIG. 3 is a block diagram of a nonlinear waveform distortion compensation unit includable in the optical communication system of FIG. 2 according to some embodiments.

FIG. 3 is a block diagram of a nonlinear waveform distortion compensation unit includable in the optical communication system of FIG. 2 according to some embodiments. In some embodiments, the nonlinear waveform distortion compensation unit of FIG. 3 corresponds to the nonlinear waveform compensation unit 1311 of the optical communication system 10. In some embodiments, the nonlinear waveform compensation unit of FIG. 3 is included in a different optical system from the optical communication system 10. For the sake of clarity, the description will use the reference number 1311 for the nonlinear waveform distortion compensation unit of FIG. 3.

The nonlinear waveform distortion compensation unit 1311 includes a functionality of a neural network with a recursive intermediate layer to reduce an overall size of a circuit that includes the nonlinear waveform distortion compensation unit 1311. As shown in FIG. 3, the nonlinear waveform distortion compensation unit 1311 has an input layer 140, an intermediate layer 141, and an output layer 142. The input layer 140 has a product-sum (PS) calculation unit 15-0. The received data input to the waveform distortion compensating unit 131 is input to the input layer 140 included in the non-linear waveform distortion compensating unit 1311. The intermediate layer 141 has a product-sum calculation unit 15-1, a representative (Rep.) value replacement unit 151-1 and a multiplication value LUT 152-1. The output layer 142 has a product-sum calculation unit 15-2, a representative value replacement unit 151-2, and a multiplication value LUT 152-2. The received data which has been compensated for the non-linear waveform distortion contained in the received data is output from the output layer 142

Figure 4:
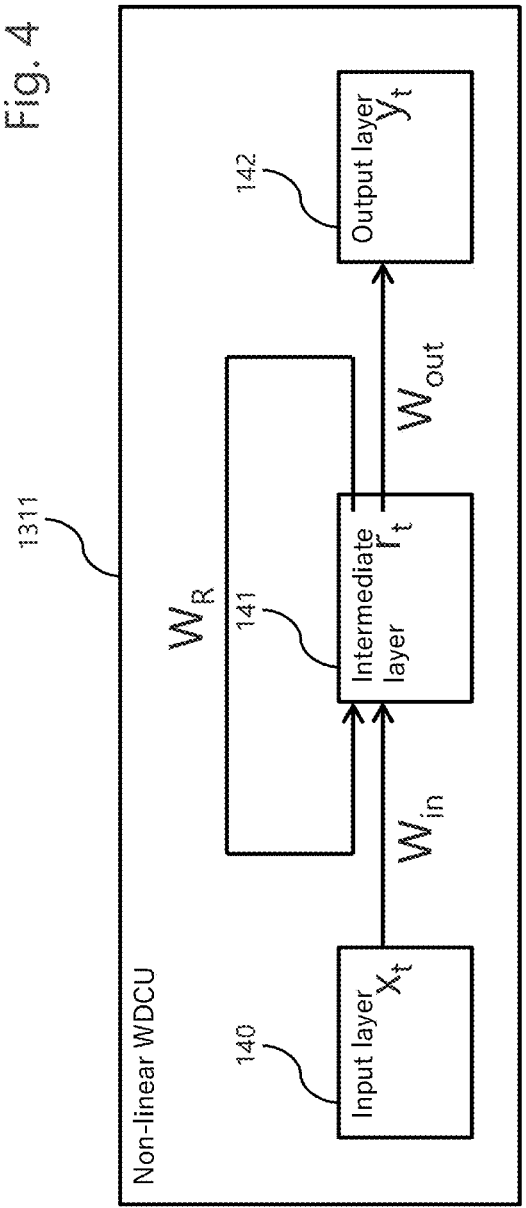
FIG. 4 is a block diagram of a nonlinear waveform distortion compensation unit includable in the optical communication system of FIG. 2 according to some embodiments.

FIG. 4 is a block diagram of a nonlinear waveform distortion compensation unit includable in the optical communication system of FIG. 2 according to some embodiments. In some embodiments, the nonlinear waveform distortion compensation unit of FIG. 4 corresponds to the nonlinear waveform compensation unit 1311 of the optical communication system 10. In some embodiments, the nonlinear waveform compensation unit of FIG. 4 is included in a different optical system from the optical communication system 10. For the sake of clarity, the description will use the reference number 1311 for the nonlinear waveform distortion compensation unit of FIG. 4.

As shown in FIG. 4, in the input layer 140, the product-sum operation of the weight matrix $W_0$, the addition of the bias value $b_0$, and the activation function operation $f_0$ are performed on the received data s by the product-sum calculation unit 15-0. The input layer 140 outputs a value of $f_0$ ($\Sigma W_0 s + b_0$). Next, the input value of the intermediate layer 141 is the output value of the input layer 140 described above. For the sake of simplicity, the input value of the intermediate layer 141 is labeled as x. An output value of the intermediate layer is labeled r, and is called the representative value. In the intermediate layer 141, the product-sum calculation with the weight matrix $W_{in}$ is performed on the input value, x, of the intermediate layer 141 by the product-sum calculation unit 15-1. After substituting the representative value, $r_{t-1}$, using the replacement unit 151-1 and multiplying the multiplication value, $W_R$, from the multiplication value LUT 152-1, corresponding to the representative value, in the product-sum calculation unit 15-1, the bias value b R is added. The activation function calculation, $f_R$, is calculated in the product-sum calculation unit That is, the output value of the intermediate layer 141 for each iteration, or epoch, is determined using equation (1)

$$r_t = f_R(\Sigma W_{in} x_t + \Sigma W_R r_{t-1} + b_R)$$ Equation (1)

where $r_t$ is an output of the intermediate layer 141 at time t, $x_t$ is an input value of the intermediate layer 141 at time t. The value of $W_R$ is not a value calculated by the product-sum operation, but a value obtained by reading the multiplication value LUT 152-1 based on the representative value corresponding to $r_{t-1}$.

An input value of the output layer 142 is the output value r of the intermediate layer 141 in a final iteration or epoch of the intermediate layer 141. In the output layer 142, the representative value, r, corresponding to the output value of the intermediate layer 141 is replaced with the representative value in the representative value replacement unit 151-2. After replacement, the multiplication value, $W_{out}$, corresponding to the representative value multiplied to the representative value, $r_t$, and then added to the bias value, $b_{out}$, by the product-sum calculation unit 15-2. The multiplication value, $W_{out}$, is a value read from the multiplication value LUT 152-2. That is, the output value, $y_t$, of the output layer 142, is determined using equation (2)

$$y_t = \Sigma W_{out} r_t + b_{out}$$

As stated above, $W_{out}$ is not a value calculated by the product-sum operation, but a value obtained by reading the multiplication value LUT 152-2 based on the representative value corresponding to $r_t$.

Figure 5:
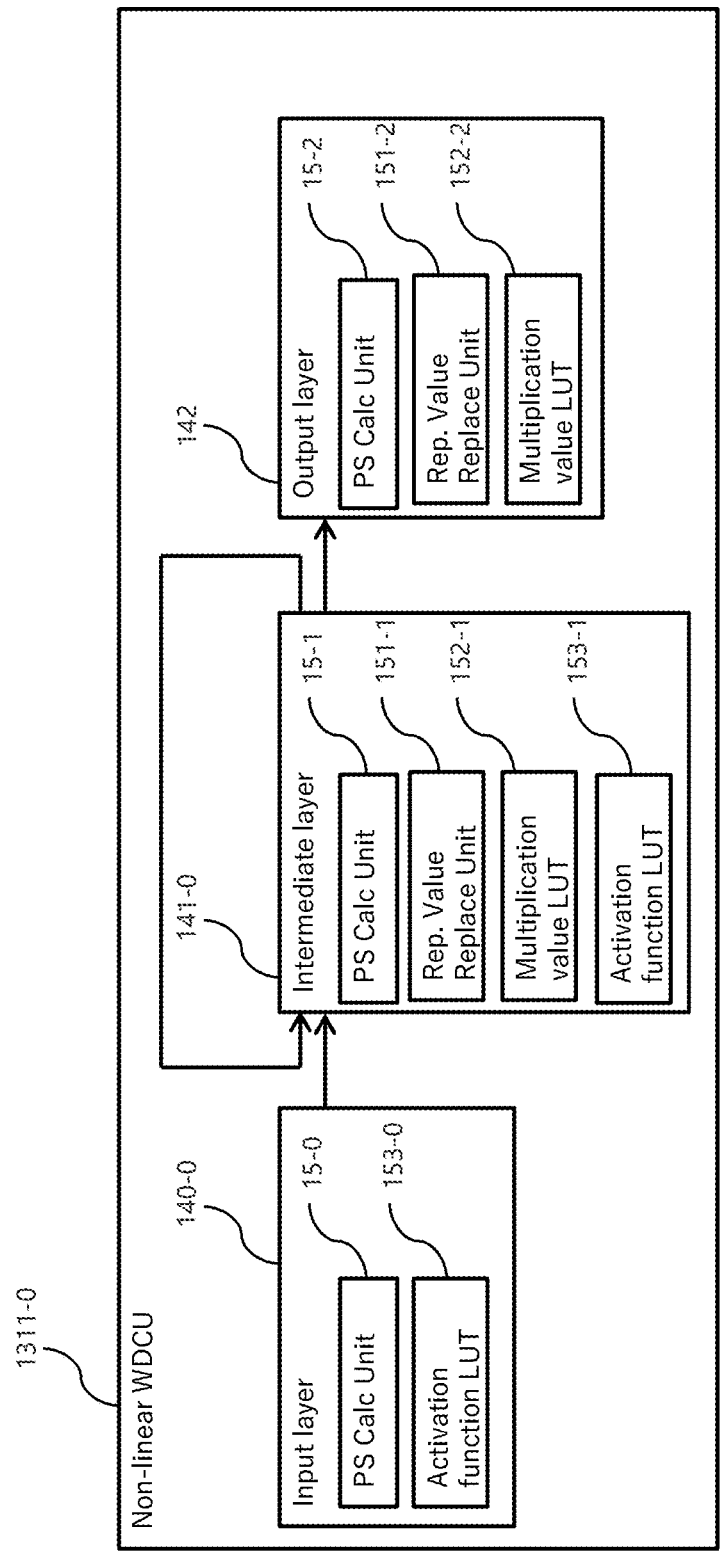
FIG. 5 is a block diagram of a nonlinear waveform distortion compensation unit includable in the optical communication system of FIG. 2 according to some embodiments.

FIG. 5 is a block diagram of a nonlinear waveform distortion compensation unit 1311-0 includable in the optical communication system of FIG. 2 according to some embodiments. The nonlinear waveform distortion compensation unit 1311-0 is similar to the nonlinear waveform distortion compensation unit 1311. In comparison with the nonlinear waveform distortion compensation unit 1311, the non-linear waveform distortion compensating unit 1311-0 employs a waveform distortion equalization method in which the input layer 140-0 includes the activation function LUT 153-0; the intermediate layer having an activation function LUT 153-1.

In the non-linear waveform distortion compensation unit 1311, the activation function operations in the input layer 140 and the intermediate layer 141 were performed by the product-sum calculation units 15-0 and 15-1, respectively. However, in the non-linear waveform distortion compensation unit 1311-0, the values of the activation functions are determined for the input layer 140 and the intermediate layer 141 using the activation functions LUT 153-0 and 153-1, respectively.

Recursive neural networks are usable to solve regression problems in the waveform distortion equalization method. As a result, the activation function calculation is not performed in the output layer 142. The product-sum calculation unit 15-2 is still included in the output layer 142. In some embodiments, the activation function operation is performed using the product-sum calculation unit 15-2. Further, if the output layer 142 includes the activation function LUT like the input layer 140-1 and the intermediate layer 141-1, obtaining the output value of the output layer by referring to the activation function LUT is also possible, in some embodiments.

Further, the input to the input layer 140 is not limited to the above-mentioned received data. In some embodiments, preprocessed received data obtained by performing preprocessing on the received data is used. Principal component analysis, Volterra nuclear processing, and tanh function processing are examples of preprocessing operations performed on the received data prior to operations by the input layer 140 described above.

Figure 6:
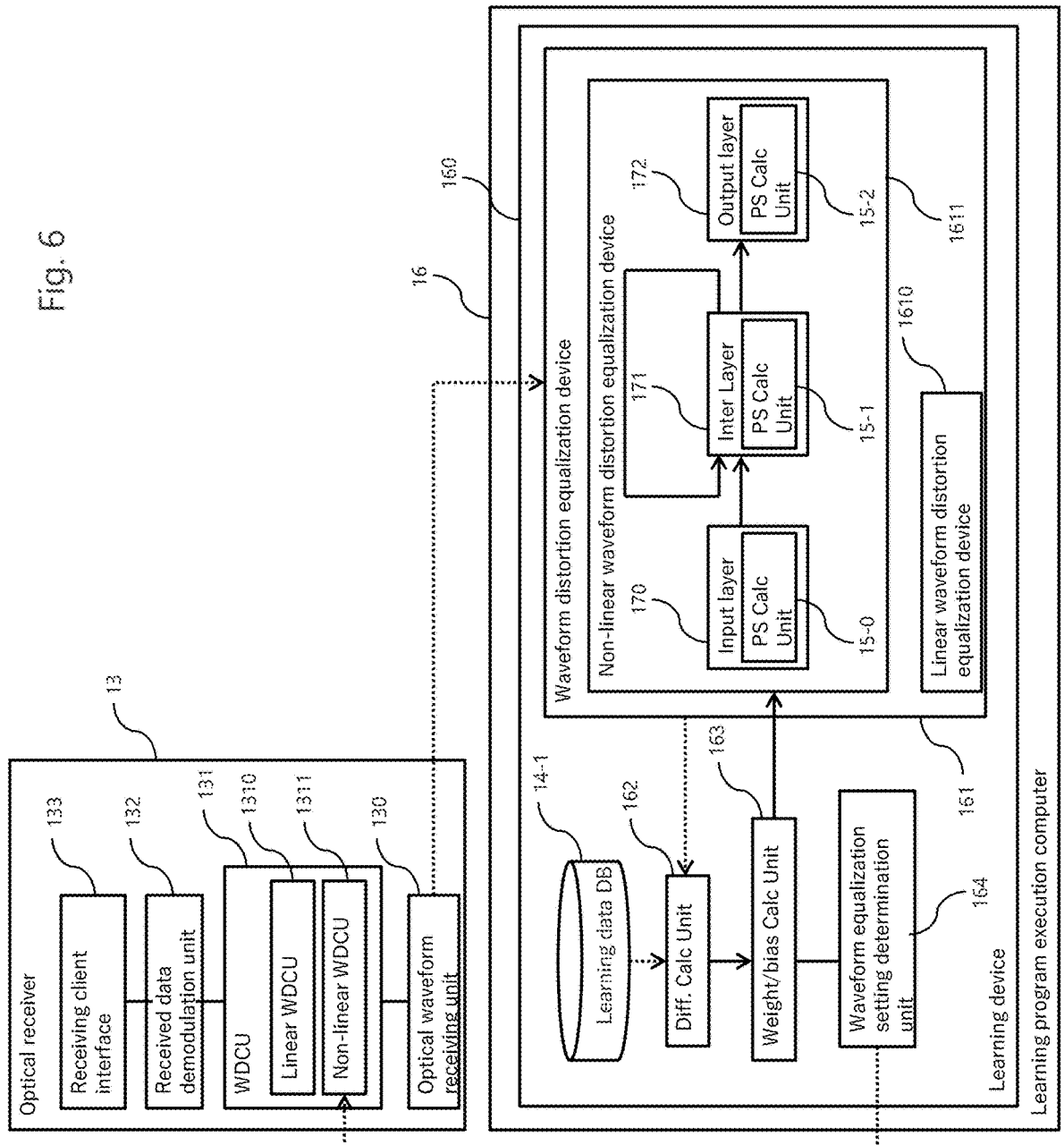
FIG. 6 is a block diagram of a portion of the optical communication system according to some embodiments.

FIG. 6 is a block diagram of a portion of the optical communication system 10 according to some embodiments. The learning program execution computer 16 includes a learning device 160 for a nonlinear waveform distortion compensating unit 1311 that employs a waveform equalization method according to some embodiments. For the purpose of this description, the term learning program refers to a set of instructions stored in a non-transitory computer readable medium for causing the learning program execution computer 16 to implement the functionality associated with the learning device 160.

The functionality of the learning device 160 is executed on the learning program execution computer 16, and the learning device 160 includes a learning data DB 14-1, a waveform distortion equalization device 161, a difference calculation unit 162, and a weight/bias calculation unit 163. The learning device 160 also includes a waveform equalization setting determination unit 164. The waveform distortion equalization device 161 includes a linear waveform distortion equalization device 1610 and a nonlinear waveform distortion equalization device 1611. The nonlinear waveform distortion equalization devices 1611 has an input layer 170, an intermediate layer 171 and an output layer 172. The input layer 170, the intermediate layer 171 and the output layer 172 each have a product-sum calculation unit 15-0, 15-1 and 15-2, respectively.

The optical receiver 13 and the learning program execution computer 16 are connected, and the received data acquired by the optical waveform receiving unit 130 is input to the waveform distortion equalization device 161. The weight matrices $W_0$, Win, $W_R$, $W_{out}$; bias values $b_0$, $b_R$, and $b_{out}$; and the output value r of the intermediate layer 141 are set values determined by the setting determination unit 164 for the nonlinear waveform distortion compensation unit 1311. The weight matrix, $W_R$, value to be stored in the LUT about the product of the $W_{out}$ and the representative value are provided to the nonlinear waveform distortion compensation unit 1311. Further, the activation function used in the nonlinear waveform distortion equalization device 161 is also able to be transmitted to the non-linear waveform distortion compensation unit 1311 from the waveform equalization setting notification unit 164. In some embodiments, transmitting the value to be stored in the activation function LUT is also able to be transferred to the nonlinear waveform distortion compensation unit 1311.

In some embodiments where an optical communication system having a plurality of optical receivers 13, the learning program execution computer 16 is connected to an optical receiver that utilizes learning to execute learning for general purposes. In some embodiments, functionality of the learning program execution computer 16 is performed using a general-purpose computer, a microcomputer, an FPGA, or the like. In some embodiments, functionality of the learning program execution computer 16 is implemented using the system 1500 (FIG. 15) discussed below.

Figure 7:
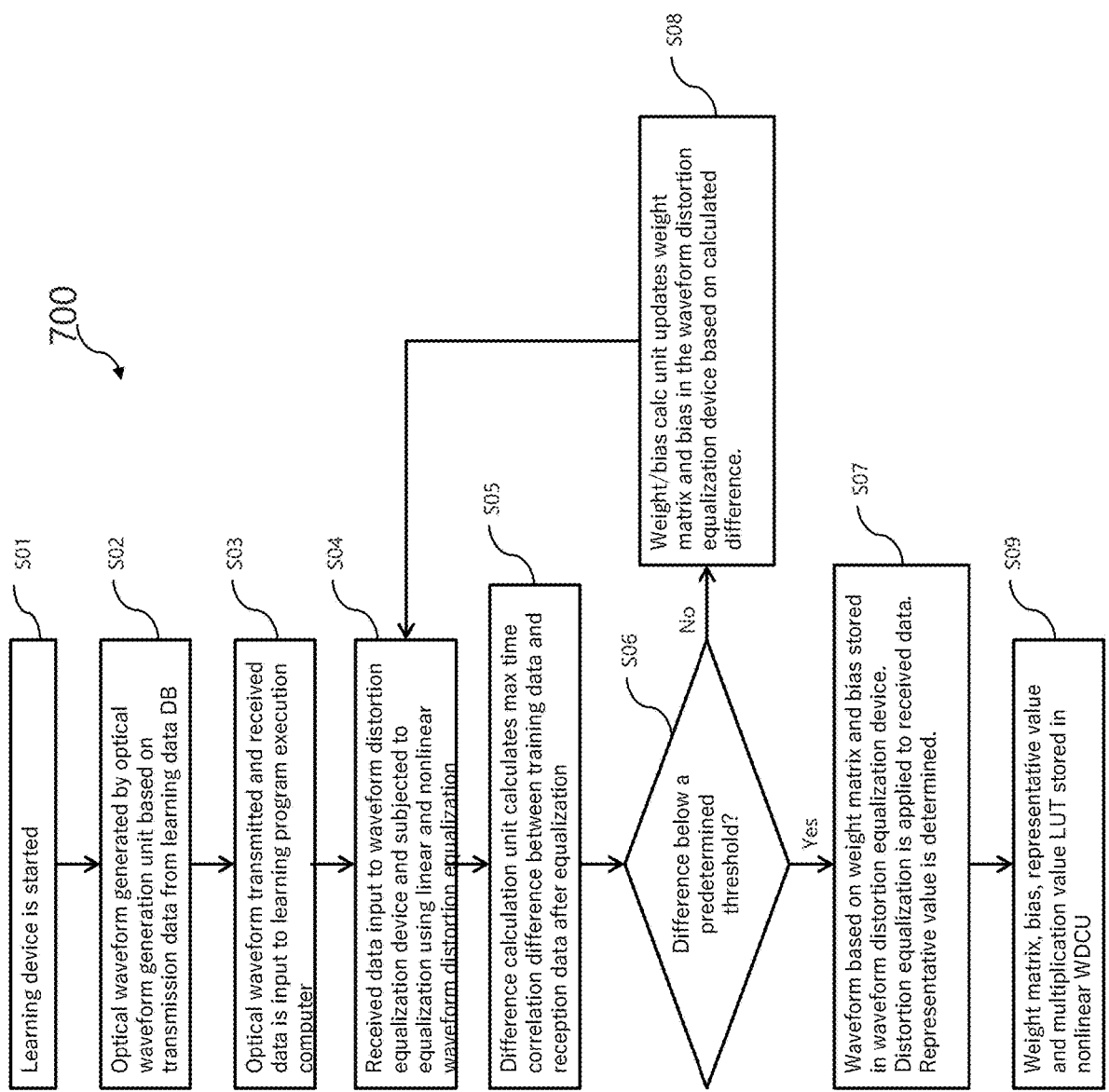
FIG. 7 is a flowchart of a method of learning to compensate for the nonlinear waveform distortion according to some embodiments.

FIG. 7 is a flowchart of a method 700 of learning to compensate for the nonlinear waveform distortion according to some embodiments. In some embodiments, the method 700 is executed by the learning device 160. In some embodiments, the method 700 is executed by another component usable in an optical communication system.

In operation S01, the learning device, e.g., the learning device 160, is started in a state where a learning program execution computer, e.g., the learning program execution computer 16, is operating. In some embodiments, the learning device is started in response to a detected trigger event. In some embodiments, the trigger event includes an elapse of a predetermined time period, a detected natural disaster, a detected change in a waveform received from an optical communication path, a received instruction from a user, or another suitable trigger event.

In operation S02, an optical waveform is generated by an optical waveform generation unit, e.g., the optical waveform generation unit 112. The optical waveform is generated based on transmission data read from a learning data DB, e.g., learning data DB 14, in an optical transmitter, e.g., optical transmitter 11.

In operation S03, the optical waveform transmitted through an optical fiber communication path, e.g., the optical fiber communication path 12. The transmitted optical waveform is received by an optical waveform receiving unit, e.g., the optical waveform receiving unit 130, included in an optical receiver, e.g., the optical receiver 13. The received data is input to a learning program execution computer, e.g., the learning program execution computer 16.

In operation S04, the received data is input to a waveform distortion equalization device, e.g., the waveform distortion equalization device 161, operating in the learning device. After equalizing the waveform distortion in a linear waveform distortion equalization device, e.g., the linear waveform distortion equalization device 1610, and in a nonlinear waveform distortion equalization device, e.g., the nonlinear waveform distortion equalization device 1611, the equalized waveform is transferred to a calculation unit, e.g., the calculation unit 162. In some embodiments, the nonlinear waveform distortion equalization device used in method 700 corresponds to the nonlinear waveform distortion equalization device 1611 of FIG. 8.

Figure 8:
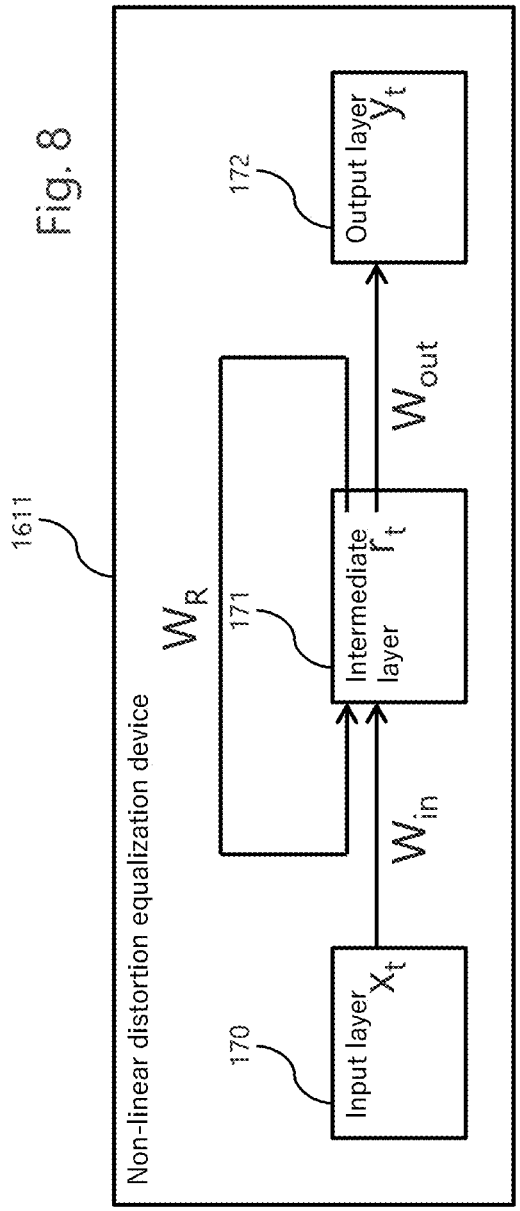
FIG. 8 is a block diagram of a nonlinear waveform distortion equalization device according to some embodiments.

FIG. 8 is a block diagram of a nonlinear waveform distortion equalization device 1611 according to some embodiments. The nonlinear distortion equalization device 1611 includes an input layer 170. The input layer 170 is configured to perform a product-sum operation and an activation function operation similar to that described above with respect to the input layer 140. The nonlinear distortion equalization device 1611 further includes an intermediate layer 171. In some embodiments, the intermediate layer 171 is similar to the intermediate layer 141. An input value of the intermediate layer 171 is the output value, x, of the input layer 170; and a recursive output value, r, of the intermediate layer 171 fed back into the intermediate layer 171. The intermediate layer 171 is configured to perform a product-sum operation on the output value, x, of the input layer 170, and a product-sum operation on the output value, r, of the intermediate layer 171 using equation (1), above. The nonlinear waveform distortion equalization device 1611 further includes an output layer 172. In some embodiments, the output layer 172 is similar to the output layer 142. An input value of the output layer 172 is the output value, r, of the intermediate layer 171. The output layer 172 is configured to perform a product-sum operation using equation (2), above.

In some embodiments, an initial value of each of the weight matrices $W_0$, $W_{in}$, $W_R$, or $W_{out}$, is independently set as a unit matrix, a random matrix, or a matrix determined based on the features of an optical fiber communication path, e.g., the optical fiber communication path 12. In some embodiments, an initial value of each of the bias values $b_0$, $b_R$, or $b_{out}$ is independently set as zero, a fixed value, or a random value. In some embodiments, the initial values of the weight matrices and/or the bias values are set based on data received from the user. In some embodiment, the initial values of the weight matrices and/or bias values are set based on empirical data obtained for similar optical fiber communication paths as that which supplies the received data for the nonlinear waveform distortion device 1611.

Returning to the method 700, in operation S05, a difference calculation unit, e.g., the difference calculation unit 162, calculates a time correlation difference between the training data read from the training data DB and the reception data after the distortion equalization. The difference calculation unit determines a timing at which an absolute value of the time correlation difference reaches a maximum value. In some embodiments, the difference calculation unit uses root-mean square error analysis or cross entropy analysis to determine the maximum time correlation difference.

In operation S06, a determination is made regarding whether or not the maximum time correlation difference value is below a predetermined threshold. In response to a determination that the maximum time correlation difference is not below the predetermined threshold, the method 700 proceeds to operation S08. In response to a determination that the maximum time correlation difference is below the predetermined threshold, the method 700 proceeds to operation S07. In some embodiments, the predetermined threshold is received from the user. In some embodiments, the predetermined threshold is based on empirical data related to similar optical communication paths.

In operation S07, the most recent iteration of the weight matrix and the bias value are stored in the nonlinear waveform distortion equalization device. Distortion equalization is applied to the received data from the optical fiber communication path, based on the stored weight matrix and bias value. A representative value is determined based on the equalized received data. In some embodiments, the representative value is determined by performing a frequency distribution for each output values of the intermediate layer 171. The output value that occurs most often is determined to be the representative value. In some embodiments, a product of the weight matrix for the intermediate layer and the weight matrix of the output layer is used to determine the representative value. In some embodiments, the product of the weight matrices is determined using values for LUTs, e.g., the LUT 152-1 and the LUT 152-2.

In operation S08, a weight/bias calculation unit, e.g., weight/bias calculation unit 163, updates the weight matrix and bias value in the nonlinear waveform distortion equalization device based on the maximum time correlation difference. The weight/bias calculation device then updates the weight matrix and bias value in the nonlinear waveform distortion equalization device; and the method 700 returns to operation S04. In some embodiments, the weight/bias calculation unit updates the weight matrix and the bias value using the stochastic gradient descent method, the Adam method, the RMSProp method, or another suitable algorithm.

In operation S09, based on the weight matrix, the bias value, the representative value, and the multiplication value LUT values determined in operation S07 are stored in a nonlinear waveform distortion compensation unit, e.g., the nonlinear waveform distortion compensation unit 1311. These stored values are usable to perform nonlinear waveform distortion compensation for further communications received using the optical fiber communication path analyzed using the method 700.

In some embodiments, the method 700 includes additional operations. For example, in some embodiments, a communication quality of the optical fiber communication path is determined in order to determine whether to further update the values stored in the nonlinear waveform distortion compensation unit. In some embodiments, the communication quality is determined based on a symbol error rate, a bit error rate, a Q value, an Error Vector Magnitude, a mutual information amount, a generalized mutual information amount, a normalized mutual information amount, or another suitable quality metric.

In some embodiments, at least one operation of the method 700 is omitted. For example, in some embodiments, the operation S06 is omitted and the updating using the weight/bias calculation unit is performed for a preset number of iterations or epochs. In some embodiments, the preset number of iterations or epochs is determined based on available processing capacity of the components used to execute the method 700.

Figure 9:
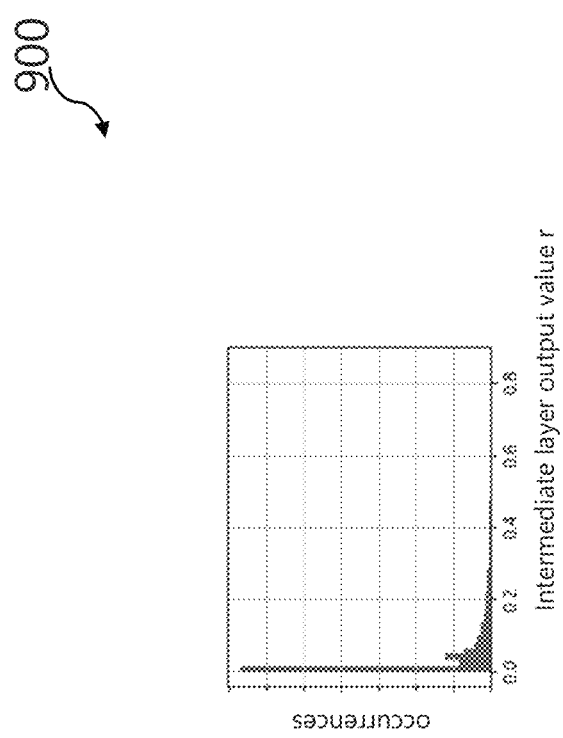
FIG. 9 is a is a graph of an occurrence distribution of output values of an intermediate layer in a nonlinear waveform distortion equalization device according to some embodiments.

FIG. 9 is a is a graph 900 of an occurrence distribution of output values of an intermediate layer in a nonlinear waveform distortion equalization device according to some embodiments. In some embodiments, the graph 900 is usable to determine a representative value, e.g., the representative value determined in operation S07. The graph 900 indicates that the frequency distribution of the output value r of the intermediate layer is distributed from 0 to 0.5. Further, the graph 900 indicates that the value is particularly localized in the vicinity of zero. By checking the distribution, a determination is made regarding which of the output values occurs most often. The value that occurs most often is usable as the representative value, e.g., the representative value determined in operation S07.

Figure 10A:
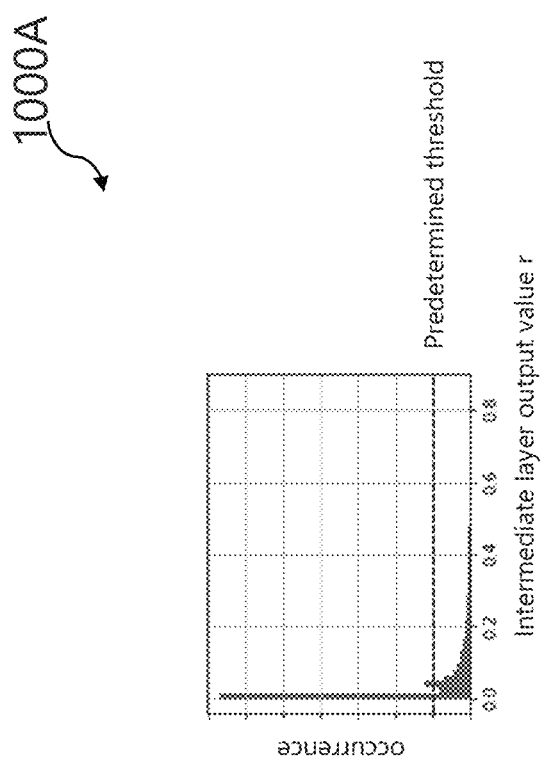
FIG. 10A is a graph of an occurrence distribution of output values of an intermediate layer in a nonlinear waveform distortion equalization device usable for determining representative value and a predetermined threshold value according to some embodiments.

FIG. 10A is a graph 1000A of an occurrence distribution of output values of an intermediate layer in a nonlinear waveform distortion equalization device usable for determining representative value and a predetermined threshold value according to some embodiments. In some embodiments, the graph 900 is usable to determine a representative value, e.g., the representative value determined in operation S07. The graph 1000A indicates which output values of the intermediate layer exceed the predetermined threshold. In some embodiments, the representative value is taken as a median value or an average value of all output values which occur sufficiently often so as to exceed the predetermined threshold.

FIG. 10B is a graph 100B of an occurrence distribution of output values of an intermediate layer in a nonlinear waveform distortion equalization device usable for determining a representative value and a plurality of intervals according to some embodiments. In some embodiments, the graph 900 is usable to determine a representative value, e.g., the representative value determined in operation S07. The graph 1000B indicates a plurality of intervals 1010A-1010D. The intervals 1010A-1010D are equally divided based on bit accuracy. In some embodiments, the representative value is taken as a median value or an average value of all output values within a most narrow interval of the intervals 1010A-1010D. In the example of the graph 1000B, the narrowest interval is interval 1010A, so the representative value would be taken as a median value or average value for all of the values within the interval 1010A.

The learning and updated described above is performed not only at initial introduction of a terminal device or optical communication path, but also during the operation of the optical communication system, in response to changes in the optical connection between the terminal devices, in response to a detected decrease in communication quality, after a predetermined time period, or at any other criteria where readjustment of the nonlinear waveform distortion compensating unit is desired.

In the waveform distortion equalization method, the intermediate layer is recursively used by re-inputting the output value of the intermediate layer back into the intermediate layer and to the output layer. By approximating the output value of the above to the representative value and storing the solution of the multiplication part of the multiply-accumulate unit in the LUT in advance, implementing non-linear waveform distortion equalization on a circuit scale deployable within a terminal device is possible. This reduced circuit scale and updating ability of the waveform distortion equalization method helps to improve optical communication, especially long distance optical communication without the use of manual intervention or analysis.

Figure 11:
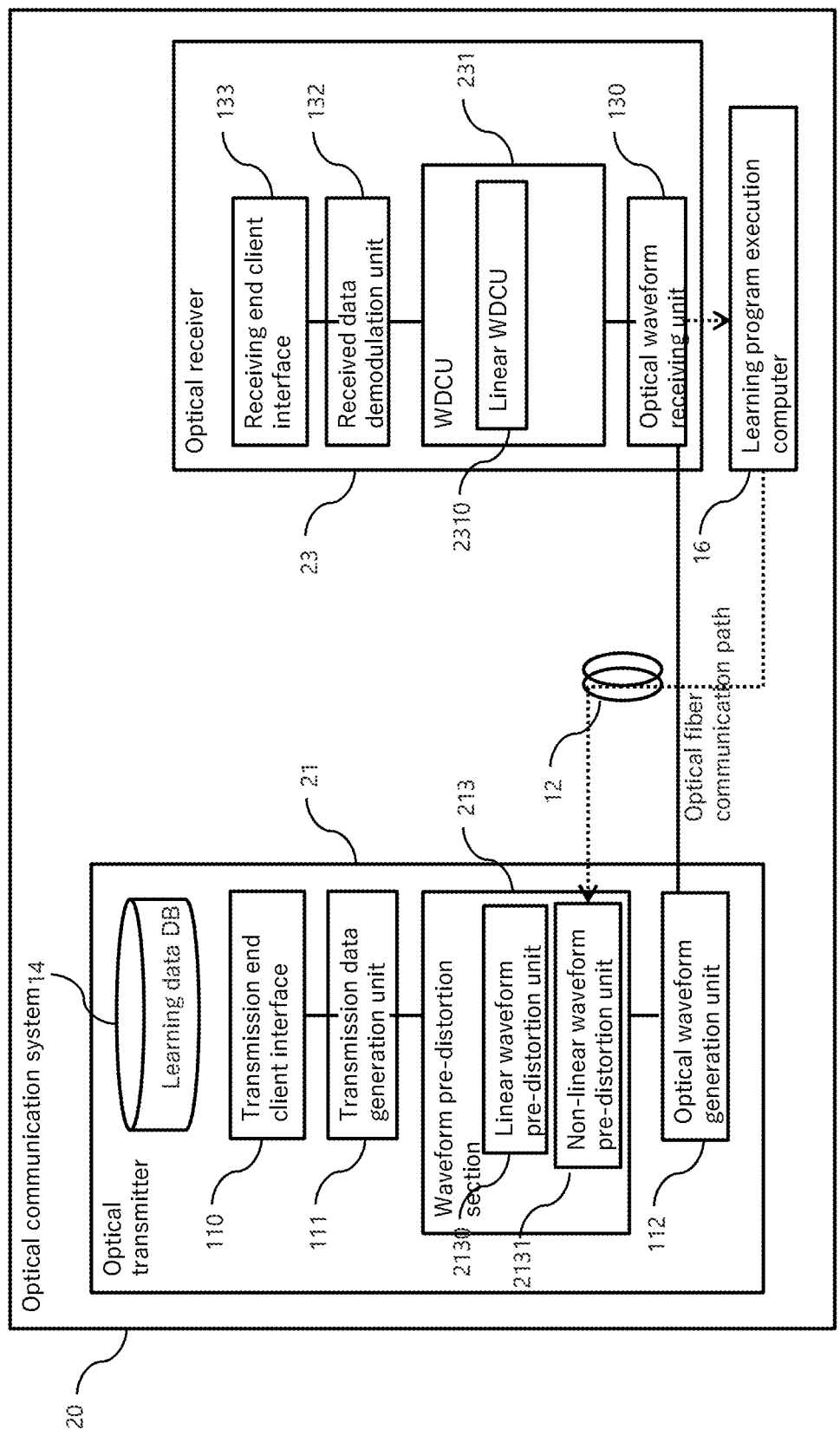
FIG. 11 is a block diagram of an optical communication system according to some embodiments.

FIG. 11 is a block diagram of an optical communication system according to some embodiments. Some components of the optical communication system 20 are similar to the optical communication system and will not be described in detail for the sake of brevity. In comparison with the optical communication system 10, the optical communication system 20 is configured to perform pre-equalization of nonlinear waveform distortions within the optical transmitter 21 instead of as part of the optical receiver 23.

The optical communication system 20 includes an optical transmitter 21, an optical fiber communication path 12, an optical receiver 23, and a learning program execution computer 16. The optical communication system 20 includes a single optical transmitter 21 and a single optical receiver 23. However, in some embodiments, more than one optical transmitter 21 or optical receiver 23 is included in the optical communication system 20. Further, in some embodiments, more than one optical fiber communication path 12 is included in the optical communication system 20.

The optical transmitter 21 has a transmission end client interface 110, a transmission data generation unit 111, an optical waveform generation unit 112, a waveform distortion estimation/equalization unit 213, and a learning data DB 14. The optical receiver 23 includes an optical waveform receiving unit 130, a waveform distortion compensating unit 231, a received data demodulation unit 132, and a receiving end client interface 133. The waveform distortion compensation unit 231 has a linear waveform distortion compensation unit 2310. In some embodiments, the linear waveform distortion compensation unit 2310 is similar to the linear waveform distortion compensation unit 1310.

The optical transmitter 21 performs symbol mapping for applying the multi-value modulation method or the polarization multiplex separation method in the transmission data generation unit 111 based on the received input from the transmission end client interface 110. The transmission data is transfer to the waveform distortion estimation/equalization unit 213. The waveform distortion estimation/equalization unit 213 is configured to predict the distortion that the optical fiber communication path 12 will impart to the waveform and to adjust the waveform prior to transmission from the optical transmitter 21. By accounting for waveform distortion in the optical transmitter 21, the optical signal received by the optical receiver 23 is expected to have reduced or no waveform distortion. The waveform distortion estimation/equalization unit 213 modifies the transmission data and outputs the modified transmission data to the waveform generation unit 112 for generation of the waveform to be transmitted along the optical fiber communication path.

The linear waveform distortion equalization unit 2130 in the waveform distortion estimation/equalization unit 213 predicts the linear waveform distortion with respect to the transmission data, and the non-linear waveform pre-distortion unit 2131 predicts nonlinear waveform distortion for the transmitted data.

The optical receiver 23 includes the linear waveform distortion compensating unit 2310 in the waveform distortion compensating unit 231 for the received data obtained by coherent detection of the received optical waveform in the optical waveform receiving unit 130 and analog-digital conversion. After compensating for the linear waveform distortion contained in the received data and performing symbol demapping due to the application of the multi-value modulation method and the polarization multiplex separation method in the received data demodulation unit 132, the data is provided to the user by the receiving end client interface 133.

The learning data DB 14 included in the optical transmitter 21 stores the learning data usable for the supervised learning in the nonlinear waveform distortion predictor equalizing unit 2131, and stores the learning data in the transmission data generation unit 111 during supervised learning.

The learning program execution computer 16 and the optical receiver 23 are connected, and learning is executed based on the received data acquired by the optical waveform receiving unit 130. Further, in order to reflect the calculation result of the learning program execution computer 16, the weight matrices $W_O$, $W_{in}$, and $W_R$, Wont; and bias values $b_O$, $b_R$, and $b_{out}$ are stored in a LUT and fed back to the nonlinear waveform pre-distortion unit 2131. In some embodiments, the learning program execution computer 16 further stores the representative value in the LUT. In some embodiments, the feedback from the learning program execution computer 16 is provided along the optical fiber communication path 12. In such embodiments, the optical receiver 23 also includes an optical transmitter (not shown) to provide the feedback from the learning program execution computer 16 to the nonlinear waveform pre-distortion unit 2131.

Figure 12:
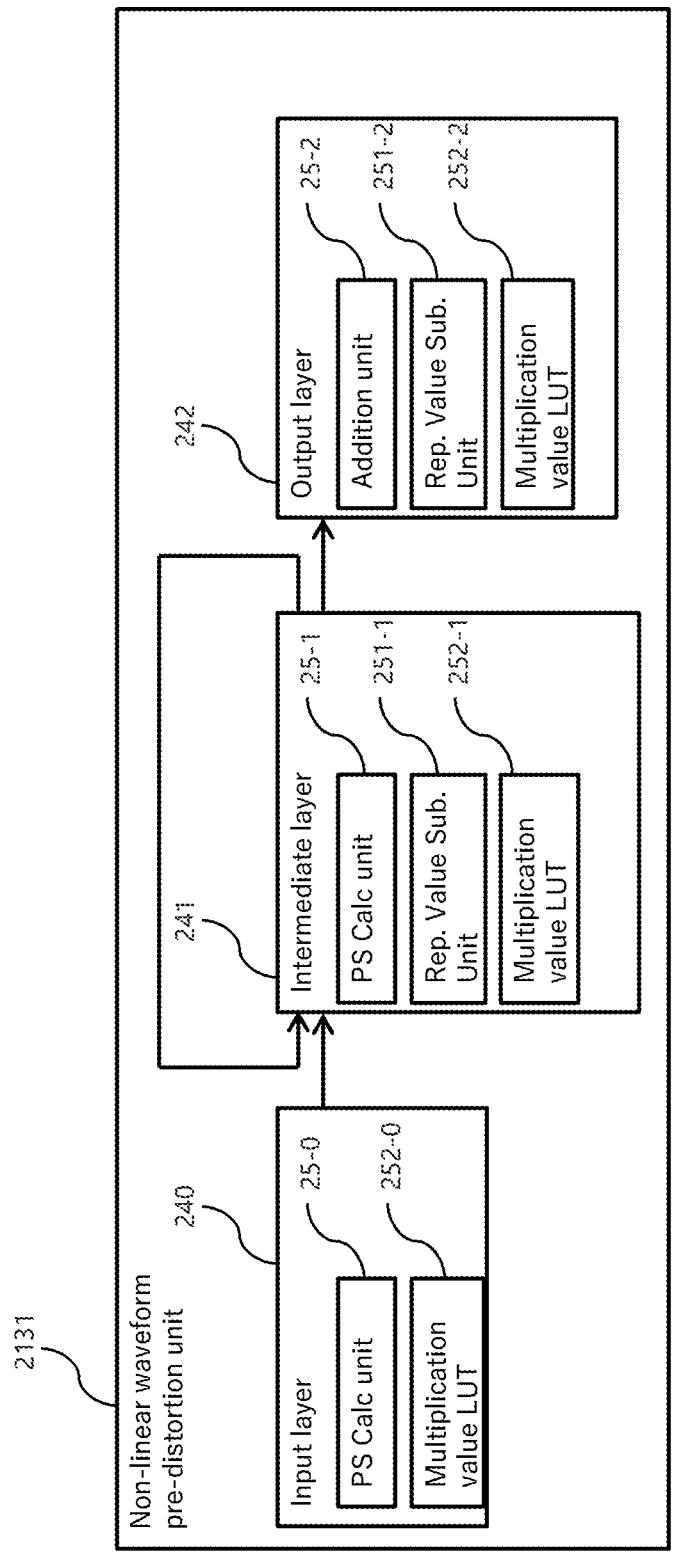
FIG. 12 is a block diagram of a nonlinear waveform pre-distortion unit includable in the optical communication system of FIG. 11 according to some embodiments.

FIG. 12 is a block diagram of a nonlinear waveform pre-distortion unit 2131 includable in the optical communication system of FIG. 11 according to some embodiments. In some embodiments, the nonlinear waveform pre-distortion unit 2131 is included in the optical communication system 20. In some embodiments, the nonlinear waveform pre-distortion unit 2131 is included in an optical communication system different from the optical communication system 20.

The nonlinear waveform pre-distortion unit 2131 has an input layer 240, an intermediate layer 241 and an output layer 242. The input layer 240 has a product-sum calculation unit 25-0 and a multiplication value LUT 252-0. The intermediate layer 241 has a product-sum calculation unit a representative value substitution unit 251-1 and a multiplication value LUT 252-1. The output layer 242 has an addition unit 25-2, a representative value replacement unit 251-2, and a multiplication value LUT 252-2. In some embodiments, the input layer 240 is similar to the input layer 140. In some embodiments, the intermediate layer 241 is similar to the intermediate layer 141. In some embodiments, the output layer 242 is similar to the output layer 142.

The nonlinear waveform pre-distortion unit 2131 includes a recursive neural network. The nonlinear waveform pre-distortion unit 2131 includes a single intermediate layer 241. In some embodiments, the nonlinear waveform pre-distortion unit 2131 includes more than one intermediate layer 241. The transmission data is input to the input layer 240 included in the non-linear waveform distortion pre-equalization unit 2131, and the transmission data in which the non-linear waveform distortion is pre-equalized is output from the output layer 242.

The input layer 240 has a multiplication value LUT 252-0, and is different in that the product-sum operation value with the weight matrix for the received data is read from the LUT. By utilizing the property that the transmission data input to the input layer 240 takes discrete values and the symmetry with respect to the I/Q axis, the product value candidates are limited in the product-sum calculation unit 25-0 in comparison with other approaches. The limited product value candidates help to reduce processing time and circuit size of the input layer 240. By storing the product value in the multiplication value LUT 252-0, the input layer 240 is able to generate the weight matrix, $W_O$, while reducing the size of circuit of the product-sum calculation unit 25-0 in comparison with other approaches. In the input layer 240, the weight matrix $W_O$ and the product are added to the received data, s, with reference to the product value from the multiplication value LUT 252-0. The bias value $b_O$ is added and the activation function operation $f_O$ is determined. The product-sum calculation unit 25-0 outputs the value of $f_O$ ($\Sigma W_O s + b_O$) to the intermediate layer 241.

In order to make advantage of the transmitted data using discrete values and symmetry with respect to the I/Q axis, performing the linear waveform distortion pre-equalization after performing the nonlinear waveform distortion pre-equalization is advantageous. In some instances, properties of the transmitted data change when the linear waveform distortion pre-equalization is performed prior to nonlinear waveform distortion pre-equalization. In some embodiments, the multiplication value LUT 252-0 is updated with information relate to the representative value periodically. In some embodiments, operation of the intermediate layer 241 is similar to operation of the intermediate layer 141 described above. In some embodiments, operation of the output layer 242 is similar to operation of the output layer 142 described above.

Figure 13:
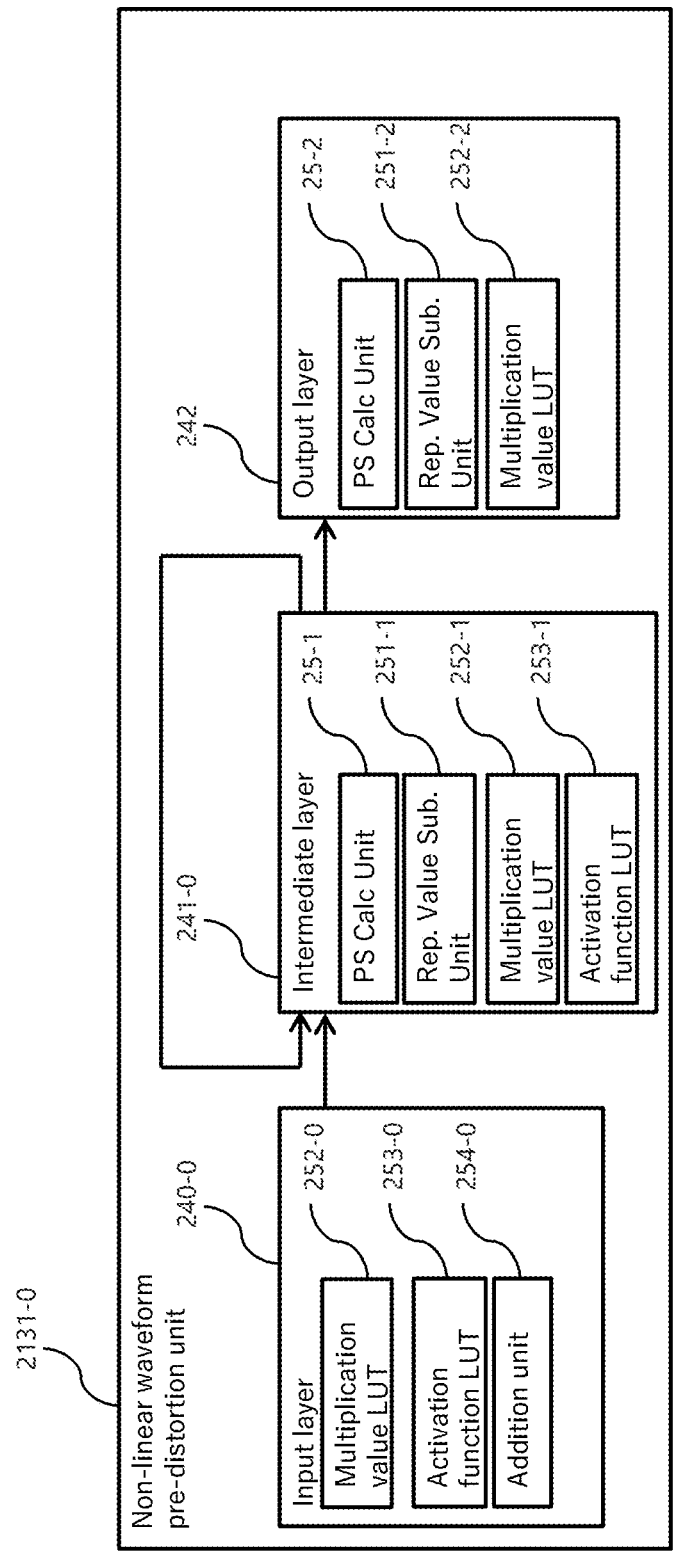
FIG. 13 is a block diagram of a nonlinear waveform pre-distortion unit according to some embodiments.

FIG. 13 is a block diagram of a nonlinear waveform pre-distortion unit 2131-0 according to some embodiments. In some embodiments, the nonlinear waveform pre-distortion unit 2131-0 is included in the optical communication system 20. In some embodiments, the nonlinear waveform pre-distortion unit 2131-0 is included in an optical communication system different from the optical communication system 20.

In the above-mentioned nonlinear waveform distortion pre-equalization unit 2131, the activation function operations in the input layer 240 and the intermediate layer 241 were performed by the product-sum calculation units 25-0 and 25-1, respectively. In comparison, in the nonlinear waveform pre-distortion unit 2131-0, values of activation function for the input layer 240-0 and the intermediate layer 241-0 are obtained with reference to the activation function LUT 253-0, and the activation function LUT 253-1, respectively. Further, in the input layer 240-0, since the received data, s, the weight matrix $W_0$, and the product are obtained by referring to the multiplication value LUT 252-0, the use of an addition unit 254-0, instead of a product-sum unit, is sufficient to implement the functionality of the input layer 240-0.

Figure 14:
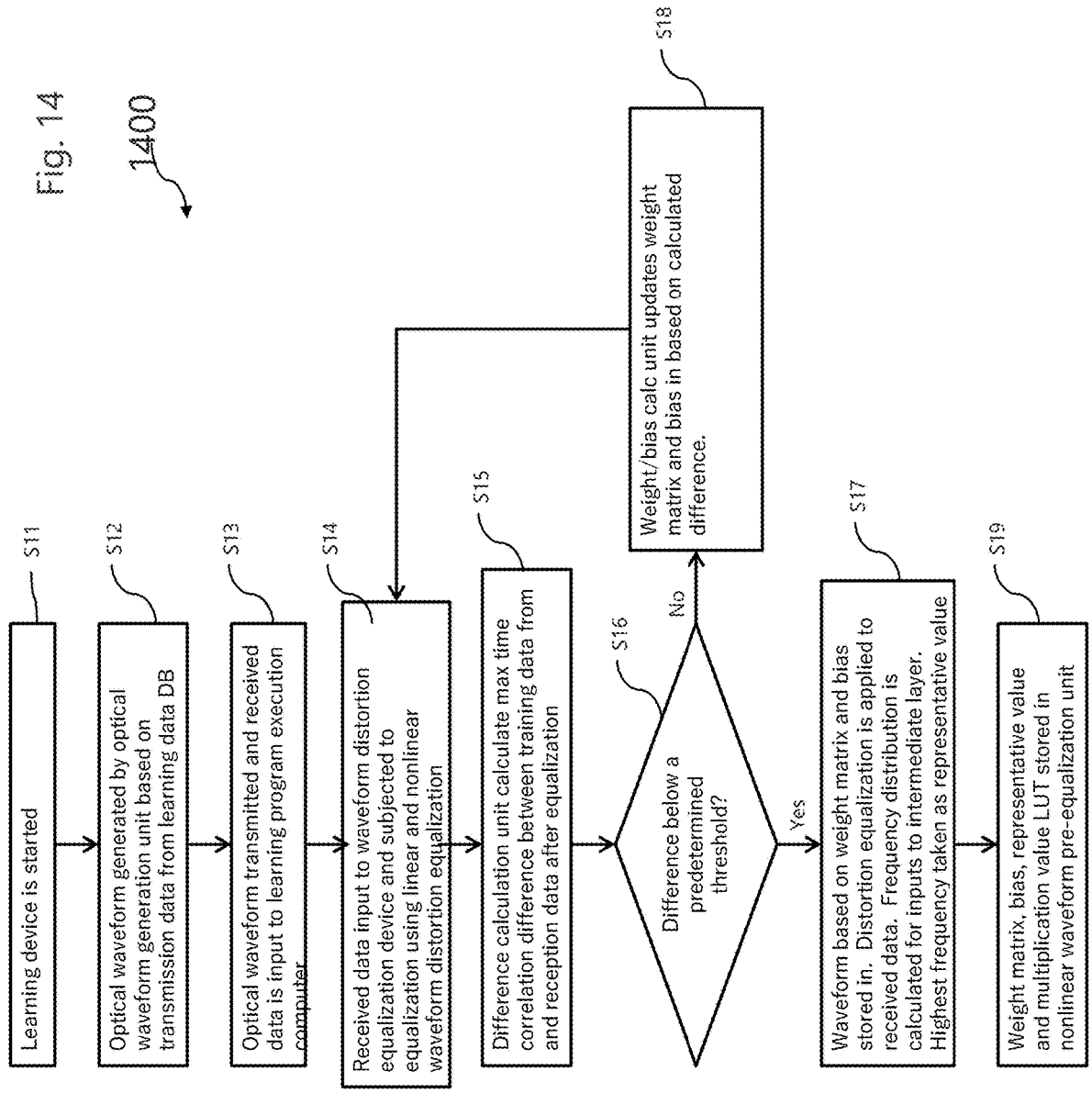
FIG. 14 is a flowchart of a method of learning for a nonlinear waveform pre-distortion device according to some embodiments.

FIG. 14 is a flowchart of a method 1400 of learning for a nonlinear waveform distortion pre-equalization device according to some embodiments. Some operations of the method 1400 are similar to operations in the method 700 and are not described in detail for the sake of brevity.

In operation S11, the learning device is started in response to a trigger event. In some embodiments, the operation S11 is similar to the operation S01.

In operation S12, the optical waveform is generated by the optical waveform generation unit based on the transmission data read from the learning data DB in the optical transmitter. In some embodiments, the operation S12 is similar to the operation S02. In operation S12, the transmission data is transmitted to the optical waveform generation unit without performing the estimation in the nonlinear waveform pre-distortion unit 2131.

In operation S13, the optical waveform is transmitted through the optical fiber communication path and is received by the optical waveform receiving unit in the optical receiver. The received data is input to the learning program execution computer. In some embodiments, the operation S13 is similar to the operation S03.

In operation S14, the received data is input to the waveform distortion equalization device in the learning device. The received data is subjected to equalization in the linear waveform distortion equalization device and the nonlinear waveform distortion equalization device. In some embodiments, the operation S14 is similar to the operation S04.

In operation S15, a difference calculation unit calculates a time correlation difference between the training data read from the training data DB and the reception data after the distortion equalization. The difference calculation unit determines a timing at which an absolute value of the time correlation difference reaches a maximum value. In some embodiments, the difference calculation unit uses root-mean square error analysis or cross entropy analysis to determine the maximum time correlation difference. In some embodiments, the operation S15 is similar to the operation S05.

In operation S16, a determination is made regarding whether or not the maximum time correlation difference value is below a predetermined threshold. In response to a determination that the maximum time correlation difference is not below the predetermined threshold, the method 1400 proceeds to operation S18. In response to a determination that the maximum time correlation difference is below the predetermined threshold, the method 1400 proceeds to operation S17. In some embodiments, the predetermined threshold is received from the user. In some embodiments, the predetermined threshold is based on empirical data related to similar optical communication paths. In some embodiments, the operation S16 is similar to the operation S06.

In operation S17, the most recent iteration of the weight matrix and the bias value are stored in the nonlinear waveform distortion equalization device. Distortion equalization is applied to the received data from the optical fiber communication path, based on the stored weight matrix and bias value. A representative value is determined based on the equalized received data. In some embodiments, the representative value is determined by performing a frequency distribution for each output values of the intermediate layer. The output value that occurs most often is determined to be the representative value. In some embodiments, a product of the weight matrix for the intermediate layer and the weight matrix of the output layer is used to determine the representative value. In some embodiments, the representative value is determined in a manner similar to those discussed above with respect to FIGS. 9-10B. In some embodiments, the operation S17 is similar to the operation S07.

In operation S18, a weight/bias calculation unit updates the weight matrix and bias value in the nonlinear waveform distortion equalization device based on the maximum time correlation difference. The weight/bias calculation device then updates the weight matrix and bias value in the non-linear waveform distortion equalization device; and the method 1400 returns to operation S14. In some embodiments, the weight/bias calculation unit updates the weight matrix and the bias value using the stochastic gradient descent method, the Adam method, the RMSProp method, or another suitable algorithm. In some embodiments, the operation S18 is similar to the operation S08.

In operation S19, the weight matrix, bias value, representative value, and multiplication value determined in operation S17 are transmitted to the nonlinear waveform pre-equalization unit, e.g., the nonlinear waveform pre-equalization unit 2131. In some embodiments, in operation S19 a communication quality of the optical system is calculated and a determination is made regarding whether further learning should be performance.

In general, the data received by the optical waveform receiving unit 130 has a larger capacity than the data transferred from the learning program execution computer 16 to the nonlinear waveform pre-distortion unit 2131. Therefore, the learning program execution computer 16 is on a same side of the optical communication system 20 as the optical receiver 23.

In some embodiments, the method 1400 includes additional operations. For example, in some embodiments, a communication quality of the optical fiber communication path is determined in order to determine whether to further update the values stored in the nonlinear waveform distortion compensation unit. In some embodiments, the communication quality is determined based on a symbol error rate, a bit error rate, a Q value, an Error Vector Magnitude, a mutual information amount, a generalized mutual information amount, a normalized mutual information amount, or another suitable quality metric.

In some embodiments, at least one operation of the method 1400 is omitted. For example, in some embodiments, the operation S16 is omitted and the updating using the weight/bias calculation unit is performed for a preset number of iterations or epochs. In some embodiments, the preset number of iterations or epochs is determined based on available processing capacity of the components used to execute the method 1400.

In the waveform distortion equalization method described with respect to the optical communication system 20 or the method 1400, approximation of the representative value, and the solution of the multiplication part of the product-sum calculation part are stored in the LUT prior to transmission of received end client data. The properties of the generated transmission data take a discrete value and have symmetry regarding the I/Q axis. Since the multiplication value LUT is able to be applied to the input layer by utilizing the properties of the generated transmission data, implementation of non-linear waveform distortion equalization is possible using on a circuit having sufficiently limited size to permit deployment in a terminal device.

One of ordinary skill in the art would recognize that optical communication system 10 describes compensation for nonlinear waveform distortion on a receiving end of an optical communication system; and that the optical communication system 20 describes compensation for nonlinear waveform distortion on a transmitting end of an optical communication system. One of ordinary skill in the art would further recognize that compensating for nonlinear waveform distortion on both the receiving end and the transmitting end of an optical communication system is within the scope of this description. While the compensation for nonlinear waveform distortion on both the receiving end and the transmitting end results in a higher processing load on the optical communication system, such a higher processing load is warranted in situations where higher levels of accuracy and precision of the communication are desired.

Figure 15:
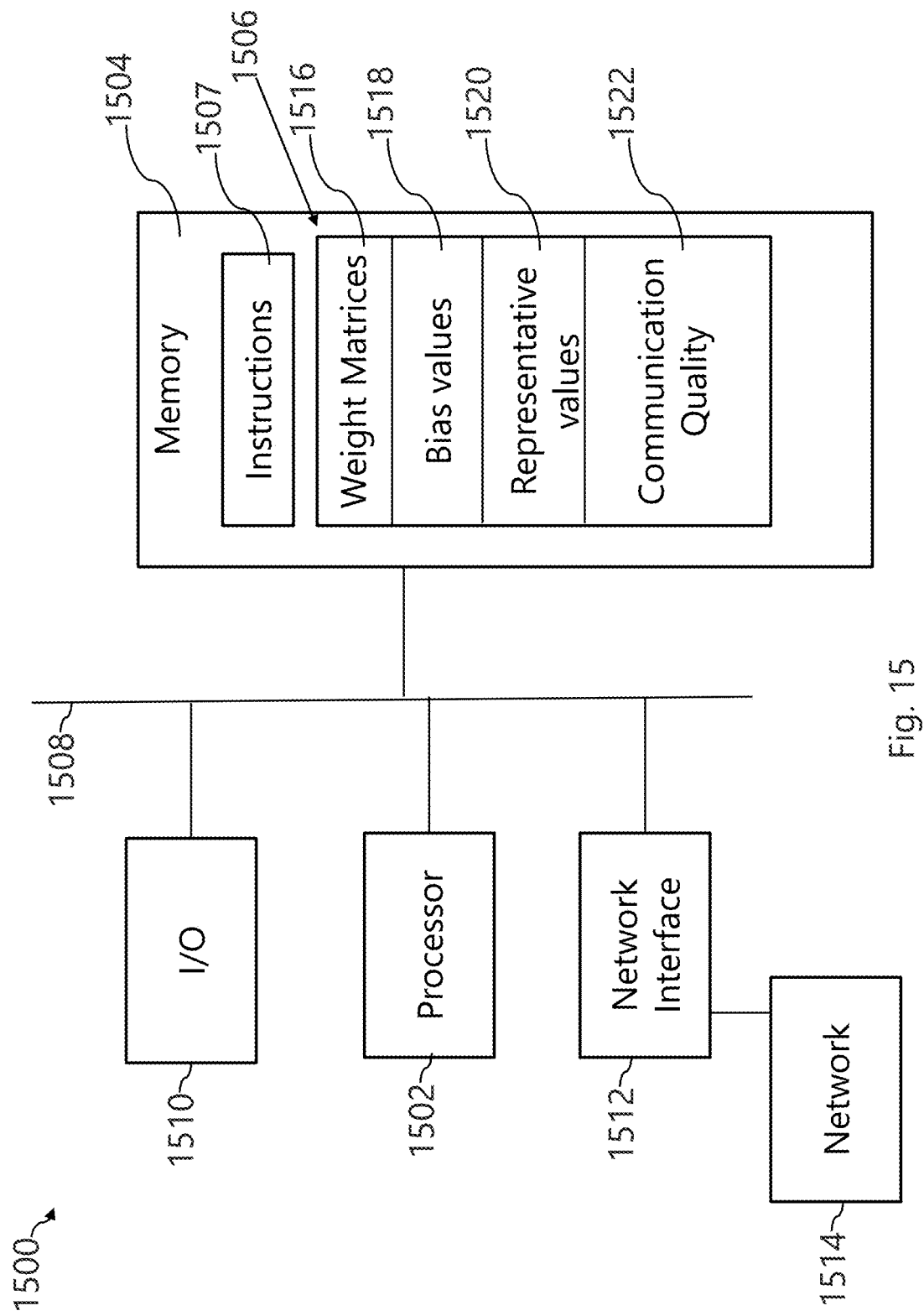
FIG. 15 is a block diagram of a system for nonlinear waveform distortion compensation according to some embodiments.

FIG. 15 is a block diagram of a system 1500 for nonlinear waveform distortion compensation according to some embodiments. System 1500 includes a hardware processor 1502 and a non-transitory, computer readable storage medium 1504 encoded with, i.e., storing, the computer program code 1506, i.e., a set of executable instructions. Computer readable storage medium 1504 is also encoded with instructions 1507 for interfacing with external devices. The processor 1502 is electrically coupled to the computer readable storage medium 1504 via a bus 1508. The processor 1502 is also electrically coupled to an I/O interface 1510 by bus 1508. A network interface 1512 is also electrically connected to the processor 1502 via bus 1508. Network interface 1512 is connected to a network 1514, so that processor 1502 and computer readable storage medium 1504 are capable of connecting to external elements via network 1514. The processor 1502 is configured to execute the computer program code 1506 encoded in the computer readable storage medium 1504 in order to cause system 1500 to be usable for performing a portion or all of the operations as described with respect to the optical communication system the method 700, the optical communication system 20, or the method 1400.

In some embodiments, the processor 1502 is a central processing unit (CPU), a multi-processor, a distributed processing system, an application specific integrated circuit (ASIC), and/or a suitable processing unit.

In some embodiments, the computer readable storage medium 1504 is an electronic, magnetic, optical, electromagnetic, infrared, and/or a semiconductor system (or apparatus or device). For example, the computer readable storage medium 1504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1504 includes a compact disk-read only memory (CD-ROM), a compact disk-read/write (CD-R/W), and/or a digital video disc (DVD).

In some embodiments, the storage medium 1504 stores the computer program code 1506 configured to cause system 1500 to perform a portion or all of the operations as described with respect to the optical communication system 10, the method 700, the optical communication system 20, or the method 1400. In some embodiments, the storage medium 1504 also stores information used for performing a portion or all of the operations as described with respect to the optical communication system the method 700, the optical communication system 20, or the method 1400 as well as information generated during performing a portion or all of the operations as described with respect to the optical communication system 10, the method 700, the optical communication system 20, or the method 1400. In some embodiments, the information includes a weight matrices parameter 1516, a bias values parameter 1518, a representative values parameter 1520, a communication quality parameter 1522 and/or a set of executable instructions to perform a portion or all of the operations as described with respect to the optical communication system 10, the method 700, the optical communication system 20, or the method 1400.

In some embodiments, the storage medium 1504 stores instructions 1507 for interfacing with manufacturing machines. The instructions 1507 enable processor 1502 to generate instructions readable by external devices to effectively implement a portion or all of the operations as described with respect to the optical communication system the method 700, the optical communication system 20, or the method 1400.

System 1500 includes I/O interface 1510. I/O interface 1510 is coupled to external circuitry. In some embodiments, I/O interface 1510 includes a keyboard, keypad, mouse, trackball, trackpad, and/or cursor direction keys for communicating information and commands to processor 502.

System 1500 also includes network interface 1512 coupled to the processor 1502. Network interface 1512 allows system 1500 to communicate with network 1514, to which one or more other computer systems are connected. Network interface 1512 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described with respect to the optical communication system 10, the method 700, the optical communication system 20, or the method 1400 is implemented in two or more systems 1500, and information such as weight matrices, bias values, representative values, or communication quality is exchanged between different systems 1500 via network 1514.

An aspect of this description relates to an optical communication system. The optical system includes a first terminal device configured to receive first data, wherein the first terminal device is configured to generate an optical waveform based on the received first data. The optical system further includes an optical communication path configured to receive the optical waveform from the first terminal device. The optical system further includes a second terminal device configured to receive the optical waveform from the optical communication path, wherein the second terminal device is configured to output second data based on the optical waveform. At least one of the first terminal device or the second terminal device includes a nonlinear waveform distortion compensation device. The nonlinear waveform compensation device is configured to correct nonlinear waveform distortion resulting from the optical waveform propagating along the optical communication path, and the nonlinear waveform compensation device includes at least one recursive intermediate layer. In some embodiments, the nonlinear waveform distortion compensation device includes a single recursive intermediate layer. In some embodiments, the nonlinear waveform distortion compensation device is configured to determine a representative value based on an output value of the at least one recursive intermediate layer. In some embodiments, the at least one recursive intermediate layer is configured to receive the output value as a first input, and to determine a subsequent output of the at least one recursive intermediate layer based on the representative value. In some embodiments, the nonlinear waveform distortion compensation unit further includes an output layer, the output layer is configured to receive the output value, and the output layer is configured to determine an output of the nonlinear waveform distortion compensation unit based on the output value and the representative value. In some embodiments, the nonlinear waveform distortion compensation unit further includes an input layer, and the at least one recursive intermediate layer is configured to receive an output of the input layer as a second input. In some embodiments, the first terminal device includes the nonlinear waveform distortion compensation unit. In some embodiments, the second terminal device includes the nonlinear waveform distortion compensation unit.

An aspect of this description relates to an optical communication method. The method includes receiving, using a first terminal device, first data. The method further includes generating an optical waveform based on the first data. The method further includes transmitting the optical waveform along an optical communication path. The method further includes receiving the transmitted optical waveform, using a second terminal device, from the optical communication path. The method further includes outputting second data from the second terminal device based on the optical waveform received by the second terminal device. The method further includes performing nonlinear waveform distortion compensation, using at least one of the first terminal device or the second terminal device, to correct nonlinear waveform distortion resulting from the optical waveform propagating along the optical communication path, and performing the nonlinear waveform compensation includes using at least one recursive intermediate layer. In some embodiments, performing the nonlinear waveform distortion compensation includes using a single recursive intermediate layer. In some embodiments, performing the nonlinear waveform distortion compensation includes determining a representative value based on an output value of the at least one recursive intermediate layer. In some embodiments, performing the nonlinear waveform distortion compensation further includes providing the output value to the at least one recursive intermediate layer as a first input, and determining a subsequent output of the at least one recursive intermediate layer based on the representative value. In some embodiments, performing the nonlinear waveform distortion compensation further includes receiving the output value using an output layer; and outputting a nonlinear waveform distortion compensated value from the output layer based on the output value and the representative value. In some embodiments, performing the nonlinear waveform distortion compensation further includes providing an output from an input layer to the at least one recursive intermediate layer as a second input. In some embodiments, performing the nonlinear waveform distortion compensation includes using the first terminal device. In some embodiments, performing the nonlinear waveform distortion compensation includes using the second terminal device.

An aspect of this description relates to a terminal for an optical communication system. The terminal device includes a nonlinear waveform distortion compensation device, wherein the nonlinear waveform compensation device is configured to correct nonlinear waveform distortion resulting from an optical waveform propagating along an optical communication path. The nonlinear waveform compensation device includes an input layer configured to receive information related to the optical waveform, wherein the input layer is configured to generate a first output. The nonlinear waveform compensation device further includes at least one recursive intermediate layer configured to receive the first output as a first input, wherein the at least one recursive intermediate layer is configured to generate a second output, and the at least one recursive intermediate layer is configured to receive the second output as a second input. The nonlinear waveform compensation device further includes an output layer configured to receive the second output, wherein the output layer is configured to generate a third output based on the second output and a representative value, wherein the representative value is based on the second output. In some embodiments, the nonlinear waveform distortion compensation device includes a single recursive intermediate layer. In some embodiments, the terminal device is configured to transmit the optical waveform to the optical communication path. In some embodiments, the terminal device is configured to receive the optical waveform from the optical communication path.

Although the present description has been described above with reference to the some embodiments, the present application is not limited to the above-described embodiments. Various changes understood by those skilled in the art are able to be made within the scope of the present application in terms of the configuration and details of the present description.

EXPLANATION OF REFERENCE NUMBERS 10, 20 optical communication system
11, 21 optical transmitter
110 Transmitter client interface
111 Transmission data generator
112 Optical waveform generator
12 Optical fiber communication path
13, 23 Optical receiver
130 Optical waveform receiver
131, 231 Waveform distortion compensation unit
1310, 2310 Linear waveform distortion compensation unit
1311, 1311-0 Non-linear waveform distortion compensation unit
132 Received data demodulation unit
133 Incoming client interface
14, 14-1 Learning data database (DB)
140, 140-0, 240, 240-0 Input layer
141, 141-0, 241, 241-0 middle layer
142, 242 output layer 15-0, 15-1, 15-2, 25-0, 25-1, 25-2 Multiply-accumulate calculation unit
151-1, 151-2, 251-1, 251-2 Representative value replacement part
152-1, 152-2, 252-0, 252-1, 252-2 Multiplying value look-up table (LUT)
153-0, 153-1, 253-0, 253-1 Activation function LUT
16 Learning program execution computer
160 learning device
161 Waveform distortion equalization device
1610 Linear waveform distortion equalization device
1611 Nonlinear waveform distortion equalization device
162 Difference calculation unit
163 Weight/bias calculation unit
164 Waveform distortion equalization setting determination unit
213 Waveform pre-distortion section
2130 Linear waveform pre-distortion section
2131, 2131-0 Non-linear waveform pre-distortion unit
254-0 addition unit
90, 90-1 Related optical communication system
91 Optical transmitter
910 Transmitter client interface
911 transmission data generator
912 Optical waveform generator
913 Waveform pre-distortion section
9130 Linear waveform distortion predictor equalizer
92 Optical fiber channel
93 Optical receiver
930 Optical waveform receiver
931 Waveform distortion compensation unit
9310 Linear waveform distortion compensation unit
9311 Non-linear waveform distortion compensation unit
932 Received data demodulation unit
933 Incoming client interface
940 input layer
941-0, 941-1, 941-2 Intermediate layer
942 output layer
95-0, 95-1, 95-2, 95-3, 95-4 Multiply-accumulate calculation unit

What is claimed is:

1. An optical communication system, comprising:
a first terminal device configured to receive first data, wherein the first terminal device is configured to generate an optical waveform based on the received first data;
an optical communication path configured to receive the optical waveform from the first terminal device; and
a second terminal device configured to receive the optical waveform from the optical communication path, wherein the second terminal device is configured to output second data based on the optical waveform,
wherein at least one of the first terminal device or the second terminal device comprises:
a nonlinear waveform distortion compensation device, wherein the nonlinear waveform compensation device is configured to correct nonlinear waveform distortion resulting from the optical waveform propagating along the optical communication path, and the nonlinear waveform compensation device comprises at least one recursive intermediate layer, and
wherein the at least one recursive intermediate layer is configured to receive an output value of the at least one recursive intermediate layer without change.

2. The optical communication system according to claim 1, wherein the nonlinear waveform distortion compensation device comprises a single recursive intermediate layer.

3. The optical communication system according to claim 1, wherein the nonlinear waveform distortion compensation device is configured to determine a representative value based on the output value of the at least one recursive intermediate layer.

4. The optical communication system according to claim 3, wherein the at least one recursive intermediate layer is configured to determine a subsequent output of the at least one recursive intermediate layer based on the representative value.

5. The optical communication system according to claim 3, wherein the nonlinear waveform distortion compensation unit further comprises an output layer, the output layer is configured to receive the output value, and the output layer is configured to determine an output of the nonlinear waveform distortion compensation unit based on the output value and the representative value.

6. The optical communication system according to claim 3, wherein the nonlinear waveform distortion compensation unit further comprises an input layer, and the at least one recursive intermediate layer is configured to receive an output of the input layer.

7. The optical communication system according to claim 1, wherein the second terminal device comprises the nonlinear waveform distortion compensation unit.

8. The optical communication system according to claim 1, wherein the first terminal device comprises a nonlinear waveform pre-distortion device configured to predict nonlinear waveform distortion.

9. An optical communication method, the method comprising:
receiving, using a first terminal device, first data;
generating an optical waveform based on the first data;
transmitting the optical waveform along an optical communication path;
receiving the transmitted optical waveform, using a second terminal device, from the optical communication path;
outputting second data from the second terminal device based on the optical waveform received by the second terminal device; and
performing nonlinear waveform distortion compensation, using at least one of the first terminal device or the second terminal device, to correct nonlinear waveform distortion resulting from the optical waveform propagating along the optical communication path, and performing the nonlinear waveform compensation comprises using at least one recursive intermediate layer, and
wherein the at least one recursive intermediate layer is configured to receive an output value of the at least one recursive intermediate layer without change.

10. The optical communication method according to claim 9, wherein performing the nonlinear waveform distortion compensation comprises using a single recursive intermediate layer.

11. The optical communication method according to claim 9, wherein performing the nonlinear waveform distortion compensation comprises determining a representative value based on the output value of the at least one recursive intermediate layer.

12. The optical communication method according to claim 11, wherein performing the nonlinear waveform distortion compensation further comprises:

determining a subsequent output of the at least one recursive intermediate layer based on the representative value.

13. The optical communication method according to claim 11, wherein performing the nonlinear waveform distortion compensation further comprises:
receiving the output value using an output layer; and
outputting a nonlinear waveform distortion compensated value from the output layer based on the output value and the representative value.

14. The optical communication method according to claim 11, wherein performing the nonlinear waveform distortion compensation further comprises providing an output from an input layer to the at least one recursive intermediate layer.

15. The optical communication method according to claim 9, wherein performing the nonlinear waveform distortion compensation comprises using the first terminal device.

16. The optical communication method according to claim 9, wherein performing the nonlinear waveform distortion compensation comprises using the second terminal device.

17. A terminal device for an optical communication system, comprising:
a nonlinear waveform distortion compensation device, wherein the nonlinear waveform compensation device is configured to correct nonlinear waveform distortion resulting from an optical waveform propagating along an optical communication path, and the nonlinear waveform compensation device comprises:
an input layer configured to receive information related to the optical waveform, wherein the input layer is configured to generate a first output;
at least one recursive intermediate layer configured to receive the first output as a first input, wherein the at least one recursive intermediate layer is configured to generate a second output, and the at least one recursive intermediate layer is configured to receive the second output without change as a second input; and
an output layer configured to receive the second output, wherein the output layer is configured to generate a third output based on the second output and a representative value, wherein the representative value is based on the second output.

18. The terminal device according to claim 17, wherein the nonlinear waveform distortion compensation device comprises a single recursive intermediate layer.

19. The terminal device according to claim 17, wherein the terminal device is configured to receive the optical waveform from the optical communication path.

20. The terminal device according to claim 17, wherein the terminal device is a transceiver configured to transmit the optical waveform to the optical communication path.

* * * * *